United States Patent
Yano et al.

(10) Patent No.: US 8,244,704 B2
(45) Date of Patent: Aug. 14, 2012

(54) RECORDING MEDIUM RECORDING OBJECT CONTENTS SEARCH SUPPORT PROGRAM, OBJECT CONTENTS SEARCH SUPPORT METHOD, AND OBJECT CONTENTS SEARCH SUPPORT APPARATUS

(75) Inventors: Ai Yano, Kawasaki (JP); Tatsuro Matsumoto, Kawasaki (JP); Eiichi Takahashi, Kawasaki (JP); Masayuki Fukui, Kawasaki (JP); Masahiro Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 610 days.

(21) Appl. No.: 12/388,969

(22) Filed: Feb. 19, 2009

(65) Prior Publication Data
US 2009/0240691 A1 Sep. 24, 2009

(30) Foreign Application Priority Data
Mar. 24, 2008 (JP) ................................. 2008-075933

(51) Int. Cl.
*G06F 7/00* (2006.01)
*G06F 17/30* (2006.01)
(52) U.S. Cl. ......... 707/705; 707/805; 707/812; 707/913
(58) Field of Classification Search ........................ None
See application file for complete search history.

(56) References Cited

U.S. PATENT DOCUMENTS

| | | | | |
|---|---|---|---|---|
| 6,229,825 B1* | 5/2001 | Nitta et al. | ..................... | 370/498 |
| 7,702,635 B2* | 4/2010 | Horvitz et al. | ................ | 709/203 |
| 7,831,586 B2* | 11/2010 | Reitter et al. | ................. | 707/709 |
| 2002/0078162 A1 | 6/2002 | Kimura | ......................... | 709/213 |
| 2003/0074671 A1* | 4/2003 | Murakami et al. | ............ | 725/109 |
| 2003/0126120 A1* | 7/2003 | Faybishenko et al. | ............ | 707/3 |
| 2006/0136405 A1* | 6/2006 | Ducatel et al. | .................... | 707/4 |
| 2006/0167862 A1* | 7/2006 | Reisman | ............................ | 707/3 |
| 2007/0124283 A1* | 5/2007 | Gotts et al. | ........................ | 707/3 |
| 2008/0140674 A1* | 6/2008 | Ishikawa | ......................... | 707/10 |
| 2008/0162469 A1* | 7/2008 | Terayoko et al. | ................. | 707/5 |
| 2008/0300914 A1* | 12/2008 | Karkanias et al. | ................ | 705/2 |

(Continued)

FOREIGN PATENT DOCUMENTS
JP 2002-268894 9/2002
(Continued)

OTHER PUBLICATIONS
Nie et al., Web Object Retrieval, May 2007, ACM, pp. 81-89.*

*Primary Examiner* — Wilson Lee
*Assistant Examiner* — Jessica N Le
(74) *Attorney, Agent, or Firm* — Staas & Halsey LLP

(57) ABSTRACT

An object contents search support apparatus supporting a user to search for desired object contents information, the object contents search support apparatus including an operating part, an information collecting part collecting composite operation information including all of contents information, an overall operation history database recording the collected composite operation information, a matching part matching historical records and extracting at least one item of contents information, a display part generating display information and displaying the generated display information, a feedback part accepting the operation input, holding the object contents information, comparing the composite operation information included in the operation input after displaying the generated object contents information, and generating effective contents information from a comparison result, and a verifying part accepting the effective contents information and the composite operation information, extracting effective operation information, and updating the certainty determination parameter.

18 Claims, 25 Drawing Sheets

U.S. PATENT DOCUMENTS

| | | | |
|---|---|---|---|
| 2009/0063989 A1* | 3/2009 | Crain et al. .................. | 715/745 |
| 2009/0172551 A1* | 7/2009 | Kane et al. ................... | 715/733 |
| 2010/0070484 A1* | 3/2010 | Kraft et al. ................... | 707/706 |
| 2011/0040751 A1* | 2/2011 | Chandrasekar et al. ...... | 707/725 |

FOREIGN PATENT DOCUMENTS

| | | |
|---|---|---|
| JP | 2006-185164 | 7/2006 |
| JP | 2006-185167 | 7/2006 |
| JP | 2006-185185 | 7/2006 |
| JP | 2006-331296 | 12/2006 |

\* cited by examiner

FIG. 9

| ID | Date and Time of Event Occurrence | Type | Event | HWND | Title | Module | Active | Left | Top | Height | Width | State Type |
|---|---|---|---|---|---|---|---|---|---|---|---|---|
| ... | ... | ... | ... | ... | ... | ... | ... | ... | ... | ... | ... | ... |
| 11 | 2008/1/1 09:00:00 | APP | | 65924 | Wakuwaku | C:\- | false | 1133 | 1148 | 210 | 22 | Normal |
| 12 | 2008/1/1 09:00:00 | APP | | 263502 | hoge.doc - Microsoft Word | D:\- | false | 498 | 0 | 1058 | 902 | Normal |
| 13 | 2008/1/1 09:00:00 | APP | | 1509308 | hoho.pdf - Adobe Acrobat | D:\- | false | 155 | 0 | 1037 | 1062 | Minimized |
| 14 | 2008/1/1 09:00:00 | APP | | 131794 | Microsoft PowerPoint - [akan.ppt] | D:\- | false | 1 | 0 | 1022 | 1352 | Minimized |
| 15 | 2008/1/1 09:00:00 | APP | | 2163986 | Hinomaru - Microsoft Internet Explorer | C:\- | true | 494 | 0 | 1022 | 906 | Normal |
| 16 | 2008/1/1 09:00:04 | Mouse | LBUTTONDOWN | 2163986 | Hinomaru - Microsoft Internet Explorer | C:\- | | 494 | 0 | 1022 | 906 | Normal |
| 17 | 2008/1/1 09:00:05 | File/Dir | Changed | | | D:\Doc\- | | | | | | |
| 18 | 2008/1/1 09:00:06 | Win | Activate | 263502 | hoge.doc - Microsoft Word | D:\- | | | | | | |
| ... | ... | ... | ... | ... | ... | ... | ... | ... | ... | ... | ... | ... |

FIG. 10

| ID | Content Access Period | Content Path | Content APP | Event Occurrence Time | Event Type | Event Window Position and Size | Event Window Type |
|---|---|---|---|---|---|---|---|
| ... | ... | ... | ... | ... | ... | ... | ... |
| 5 | 2008/1/1 08:55:00 - 2008/1/1 09:20:00 | D:\-\hoge.doc | Microsoft Word | 2008/1/1 08:55:00 | CreateWnd | [498,0,1058,902] | Normal |
|  |  |  |  | 2008/1/1 09:00:00 | APP | [498,0,1058,902] | Normal |
|  |  |  |  | 2008/1/1 09:00:06 | Activate |  |  |
|  |  |  |  | ... | ... | ... | ... |
| 6 | 2008/1/1 08:56:00 - 2008/1/1 09:15:00 | D:\-\hoho.pdf | Adobe Acrobat | 2008/1/1 08:56:00 | CreateWnd | [155,0,1037,1062] | Normal |
|  |  |  |  | 2008/1/1 09:00:00 | APP | [155,0,1037,1062] | Minimized |
| 7 | 2008/1/1 08:59:00 - 2008/1/1 10:00:00 | D:\-\akan.ppt | Microsoft PowerPoint | 2008/1/1 08:59:00 | CreateWnd | [1,0,1022,1352] | Normal |
|  |  |  |  | 2008/1/1 09:00:00 | APP | [1,0,1022,1352] | Minimized |
|  |  |  |  | 2008/1/1 09:00:15 | Key = Ctrl + C |  |  |
|  |  |  |  | ... | ... | ... | ... |
| 8 | 2008/1/1 09:00:00 - 2008/1/1 09:00:04 | http://-/index.htm | Microsoft Internet Explorer | 2008/1/1 09:00:00 | APP | [494,0,1022,906] | Normal |
|  |  |  |  | 2008/1/1 09:00:04 | LBUTTONDOWN |  |  |
| 9 | 2008/1/1 09:00:05 - 2008/1/1 09:00:05 | http://-/1.htm | Microsoft Internet Explorer | 2008/1/1 09:00:05 | LBUTTONDOWN |  |  |
| 10 | 2008/1/1 09:00:11 - 2008/1/1 09:01:40 | http://-/2.htm | Microsoft Internet Explorer | 2008/1/1 09:00:11 | Key = Ctrl + C |  |  |
|  |  |  |  | 2008/1/1 09:00:12 | Crip = hogehoge |  |  |
| ... | ... | ... | ... | ... | ... | ... | ... |

FIG. 11A

MATCHING PARAMETERS (BEFORE REFLECTION)

| EVENT NAME | SCORE |
|---|---|
| LEFT CLICK OF MOUSE | 1 |
| LEFT DOUBLE CLICK OF MOUSE | 1 |
| KEYBOARD INPUT | 2 |
| COPY TO CLIPBOARD | 2 |
| ACTIVE WINDOW TIME (SEC) | 0.1/1 SEC |
| DISPLAY TIME OF 50% OR MORE OF WINDOW (SEC) | 0.1 POINT /1 SEC |
| FILE UPDATE | 1 |
| ... | ... |

FIG. 11B

| http://-/2.htm | Microsoft Internet Explorer | ... | ... | ... |
|---|---|---|---|---|
| | | Key = Ctrl + C | | |
| | | Crip = hogehoge | | |
| | | ... | ... | ... |

FIG. 11C

MATCHING PARAMETERS (AFTER REFLECTION)

| EVENT NAME | SCORE |
|---|---|
| LEFT CLICK OF MOUSE | 1 |
| LEFT DOUBLE CLICK OF MOUSE | 1 |
| KEYBOARD INPUT | 2 |
| COPY TO CLIPBOARD | 3 |
| ACTIVE WINDOW TIME (SEC) | 0.1/1 SEC |
| DISPLAY TIME OF 50% OR MORE OF WINDOW (SEC) | 0.1 POINT /1 SEC |
| FILE UPDATE | 1 |
| ... | ... |

REFLECTION (+1) TO SCORE OF "COPY TO CLIPBOARD"

FIG. 12A

MATCHING PARAMETERS (BEFORE REFLECTION)

| EVENT NAME | SCORE |
|---|---|
| ... | ... |
| STARTUP FROM FILE EXPLORE | 1 |
| STARTUP FROM MAIL | 1 |
| STARTUP FROM CHAT | 1 |
| STARTUP FROM Web BROWSER | 1 |
| STARTUP FROM BOOKMARKS | 1 |
| STARTUP FROM RESULT OF SEARCH SERVICE | 1 |
| ... | ... |

FIG. 12B

| http://-/2.htm | Chat Client | LBUTTONDOWN | | |
|---|---|---|---|---|
| | Microsoft Internet Explorer | CreateWnd | | |
| | | ... | ... | ... |

FIG. 12C

MATCHING PARAMETERS (AFTER REFLECTION)

| EVENT NAME | SCORE |
|---|---|
| ... | ... |
| STARTUP FROM FILE EXPLORE | 1 |
| STARTUP FROM MAIL | 1 |
| STARTUP FROM CHAT | 2 |
| STARTUP FROM Web BROWSER | 1 |
| STARTUP FROM BOOKMARKS | 1 |
| STARTUP FROM RESULT OF SEARCH SERVICE | 1 |
| ... | ... |

REFLECTION (+1) TO SCORE OF "STARTUP FROM CHAT"

FIG. 16

| ID | Content Access Period | Content Path | Content APP | Object Flag | Event | | | |
|---|---|---|---|---|---|---|---|---|
| | | | | | Occurrence Time | Type | Window Position and Size | Window Type |
| ... | ... | ... | ... | ... | ... | ... | ... | ... |
| 5 | 2008/1/1 08:55:00 - 2008/1/1 09:20:00 | D:\\hoge.doc | Microsoft Word | True | 2008/1/1 08:55:00 | CreateWnd | [498,0,1058,902] | Normal |
| | | | | | 2008/1/1 09:00:00 | APP | [498,0,1058,902] | Normal |
| | | | | | 2008/1/1 09:00:06 | Activate | | |
| | | | | | ... | ... | ... | ... |
| 6 | 2008/1/1 08:56:00 - 2008/1/1 09:15:00 | D:\\hoho.pdf | Adobe Acrobat | True | 2008/1/1 08:56:00 | CreateWnd | [155,0,1037,1062] | Normal |
| | | | | | 2008/1/1 09:00:00 | APP | [155,0,1037,1062] | Minimized |
| | | | | | ... | ... | ... | ... |
| 7 | 2008/1/1 08:59:00 - 2008/1/1 10:00:00 | D:\\akan.ppt | Microsoft PowerPoint | True | 2008/1/1 08:59:00 | CreateWnd | [1,0,1022,1352] | Normal |
| | | | | | 2008/1/1 09:00:00 | APP | [1,0,1022,1352] | Minimized |
| | | | | | 2008/1/1 09:00:15 | Key = Ctrl + C | | |
| 8 | 2008/1/1 09:00:00 - 2008/1/1 09:00:04 | http://-/index.htm | Microsoft Internet Explorer | False | 2008/1/1 09:00:00 | APP | [494,0,1022,906] | Normal |
| | | | | | 2008/1/1 09:00:04 | LBUTTONDOWN | | |
| 9 | 2008/1/1 09:00:05 - 2008/1/1 09:00:05 | http://-/1.htm | Microsoft Internet Explorer | False | 2008/1/1 09:00:05 | LBUTTONDOWN | | |
| 10 | 2008/1/1 09:00:11 - 2008/1/1 09:01:40 | http://-/2.htm | Microsoft Internet Explorer | True | 2008/1/1 09:00:11 | Key = Ctrl + C | | |
| | | | | | 2008/1/1 09:00:12 | Crip = hogehoge | | |
| ... | ... | ... | ... | ... | ... | ... | ... | ... |

FIG. 17A

OBJECT CONTENT DETERMINATION CRITERIA
(BEFORE REFLECTION)

| EVENT NAME | SCORE |
|---|---|
| LEFT CLICK OF MOUSE | 1 |
| LEFT DOUBLE CLICK OF MOUSE | 1 |
| KEYBOARD INPUT | 2 |
| COPY TO CLIPBOARD | 2 |
| ACTIVE WINDOW TIME (SEC) | 0.1/1 SEC |
| DISPLAY TIME OF 50% OR MORE OF WINDOW (SEC) | 0.1 POINT /1 SEC |
| FILE UPDATE | 1 |
| ... | ... |

FIG. 17B

| http://-/2.htm | Microsoft Internet Explorer | ... | ... | ... |
|---|---|---|---|---|
| | | Key = Ctrl + C | | |
| | | Crip = hogehoge | | |
| | | ... | ... | ... |

FIG. 17C

OBJECT CONTENT DETERMINATION CRITERIA
(AFTER REFLECTION)

| EVENT NAME | SCORE |
|---|---|
| LEFT CLICK OF MOUSE | 1 |
| LEFT DOUBLE CLICK OF MOUSE | 1 |
| KEYBOARD INPUT | 2 |
| COPY TO CLIPBOARD | 3 |
| ACTIVE WINDOW TIME (SEC) | 0.1/1 SEC |
| DISPLAY TIME OF 50% OR MORE OF WINDOW (SEC) | 0.1 POINT /1 SEC |
| FILE UPDATE | 1 |
| ... | ... |

REFLECTION (+1) TO SCORE OF "COPY TO CLIPBOARD"

FIG. 20A

MATCHING PARAMETERS (BEFORE REFLECTION)

| EVENT NAME | SCORE |
|---|---|
| LEFT CLICK OF MOUSE | 1 |
| LEFT DOUBLE CLICK OF MOUSE | 1 |
| KEYBOARD INPUT | 2 |
| COPY TO CLIPBOARD | 2 |
| ACTIVE WINDOW TIME (SEC) | 0.1/1 SEC |
| DISPLAY TIME OF 50% OR MORE OF WINDOW (SEC) | 0.1 POINT /1 SEC |
| FILE UPDATE | 1 |
| ... | |

FIG. 20B

| LBUTTONDOWN | 20 |
|---|---|
| LBUTTONDBLCLK | 30 |
| Drag, Ctrl + V | 5 |
| ... | ... |
| Key = Ctrl + C, Ctrl + V | 200 |
| Key = Ctrl + X, Ctrl + V | 100 |
| Key = Alt + Tab | 1000 |
| Key = Ctrl + S | 5000 |
| ... | ... |

FIG. 20C

MATCHING PARAMETERS (AFTER REFLECTION)

| EVENT NAME | SCORE |
|---|---|
| LEFT CLICK OF MOUSE | 1 |
| LEFT DOUBLE CLICK OF MOUSE | 1 |
| KEYBOARD INPUT | 4 |
| COPY TO CLIPBOARD | 3 |
| ACTIVE WINDOW TIME (SEC) | 0.1/1 SEC |
| DISPLAY TIME OF 50% OR MORE OF WINDOW (SEC) | 0.1 POINT /1 SEC |
| FILE UPDATE | 1 |
| ... | ... |

⇐ INCREASE (DOUBLE) SCORE OF KEYBOARD OPERATION TWICE SCORE OF MOUSE OPERATION

FIG. 21

MATCHING PARAMETERS AND OBJECT
CONTENT DETERMINATION CRITERIA

| APPLICATION NAME | EVENT NAME | SCORE |
|---|---|---|
| WORD PROCESSOR SOFTWARE | LEFT CLICK OF MOUSE | 1 |
| | LEFT DOUBLE CLICK OF MOUSE | 1 |
| | KEYBOARD INPUT | 2 |
| | COPY TO CLIPBOARD | 2 |
| | ACTIVE WINDOW TIME (SEC) | 0.1/1 SEC |
| | DISPLAY TIME OF 50% OR MORE OF WINDOW (SEC) | 0.1 POINT/ 1 SEC |
| | FILE UPDATE | 1 |
| | ... | ... |
| Web BROWSER | LEFT CLICK OF MOUSE | 1 |
| | LEFT DOUBLE CLICK OF MOUSE | 1 |
| | KEYBOARD INPUT | 5 |
| | COPY TO CLIPBOARD | 10 |
| | ACTIVE WINDOW TIME (SEC) | 0.1/1 SEC |
| | DISPLAY TIME OF 50% OR MORE OF WINDOW (SEC) | 0.1 POINT/ 1 SEC |
| | FILE UPDATE | 1 |
| | ... | ... |
| ... | ... | ... |

FIG. 22

MATCHING PARAMETERS AND OBJECT
CONTENT DETERMINATION CRITERIA

| USER NAME | EVENT NAME | SCORE |
|---|---|---|
| Tanaka | LEFT CLICK OF MOUSE | 1 |
| | LEFT DOUBLE CLICK OF MOUSE | 1 |
| | KEYBOARD INPUT | 2 |
| | COPY TO CLIPBOARD | 2 |
| | ACTIVE WINDOW TIME (SEC) | 0.1/1 SEC |
| | DISPLAY TIME OF 50% OR MORE OF WINDOW (SEC) | 0.1 POINT/ 1 SEC |
| | FILE UPDATE | 1 |
| | ... | ... |
| Sato | LEFT CLICK OF MOUSE | 1 |
| | LEFT DOUBLE CLICK OF MOUSE | 1 |
| | KEYBOARD INPUT | 5 |
| | COPY TO CLIPBOARD | 10 |
| | ACTIVE WINDOW TIME (SEC) | 0.1/1 SEC |
| | DISPLAY TIME OF 50% OR MORE OF WINDOW (SEC) | 0.1 POINT/ 1 SEC |
| | FILE UPDATE | 1 |
| | ... | ... |
| ... | ... | ... |

FIG. 23

MATCHING PARAMETERS AND OBJECT
CONTENT DETERMINATION CRITERIA

| GROUP NAME | EVENT NAME | SCORE |
|---|---|---|
| CLERICAL STAFF | LEFT CLICK OF MOUSE | 1 |
| | LEFT DOUBLE CLICK OF MOUSE | 1 |
| | KEYBOARD INPUT | 2 |
| | COPY TO CLIPBOARD | 2 |
| | ACTIVE WINDOW TIME (SEC) | 0.1/1 SEC |
| | DISPLAY TIME OF 50% OR MORE OF WINDOW (SEC) | 0.1 POINT/ 1 SEC |
| | FILE UPDATE | 1 |
| | ... | ... |
| TECHNICAL STAFF | LEFT CLICK OF MOUSE | 1 |
| | LEFT DOUBLE CLICK OF MOUSE | 1 |
| | KEYBOARD INPUT | 5 |
| | COPY TO CLIPBOARD | 10 |
| | ACTIVE WINDOW TIME (SEC) | 0.1/1 SEC |
| | DISPLAY TIME OF 50% OR MORE OF WINDOW (SEC) | 0.1 POINT/ 1 SEC |
| | FILE UPDATE | 1 |
| | ... | ... |
| ... | ... | ... |

FIG. 26

| Content Name and Path Name | Final Viewing Date | Number of Times of Viewing |
|---|---|---|
| ■ D:\Doc\hoho.doc | 2006/01/01 | 2 |
| ■ [Web]IyaIYA | 2006/01/01 | 1 |
| ■ D:\Doc\hoge.xls | 2006/05/01 | 1 |
| ■ D:\Doc\hehe.ppt | 2006/10/01 | 2 |
| ■ [Web]WaiWai | 2006/10/01 | 1 |

RECORDING MEDIUM RECORDING OBJECT CONTENTS SEARCH SUPPORT PROGRAM, OBJECT CONTENTS SEARCH SUPPORT METHOD, AND OBJECT CONTENTS SEARCH SUPPORT APPARATUS

CROSS-REFERENCES TO RELATED APPLICATIONS

This application is based upon and claims the benefit of priority of the prior Japanese Patent Application No. 2008-75933, filed on Mar. 24, 2008, the entire contents of which are incorporated herein by reference.

FIELD

The present embodiments discussed herein relates to a recording medium recording an object contents search support program, an object contents search support method, and an object contents search support apparatus, each of which supports users to search for object contents.

BACKGROUND

In operating computers, users often want to search for contents, such as files the users previously prepared and URLs (Uniform Resource Locators) of Web pages that the users previously viewed. For supporting the contents search, an object contents system of collecting and processing transition of Web pages viewed by a user and operations performed on a PC (Personal Computer) by the user (hereinafter referred to simply as "PC operations") is known (see, e.g., Japanese Laid-open Patent Publication No. 2006-331296).

In the object contents search support system, an experience score (1 point per sec on the basis of a viewing time at a maximum of five minutes) to determine a degree of importance is provided to each Web page in accordance with the operation performed on the Web page. When the user tries a search later by using a keyword or a date, Web pages matching with the keyword or the date are extracted from historical records of the Web pages viewed in the past. The experience score and a matching score are added to produce a total score, and the Web pages having higher total scores are sequentially presented to the user.

SUMMARY

An object contents search support apparatus supports a user to search for desired object contents information. According to an aspect of the embodiments, the object contents search support apparatus includes an operating part accepting an operation input from the user, an information collecting part collecting, in accordance with the operation input from the operating part, composite operation information including all of contents information of contents having been subjected to an operation and operation information including an operation time, an overall operation history database in which the composite operation information collected by the information collecting part is registered, a matching part matching, when the operation input is accepted, historical records of the composite operation information having been accepted during a certain period of time against historical records of the composite operation information registered in the overall operation history database, and extracting, as the object contents information, at least one item of contents information having a high certainty based on a matching result by referring to a certainty determination parameter related to the user, a display part generating display information of the object contents information extracted by the matching part and displaying the generated display information; a feedback part accepting the operation input from the user, holding the object contents information, comparing the composite operation information included in the operation input, which has been accepted after displaying the generated object contents information, with the held object contents information, and generating effective contents information from a comparison result, and a verifying part accepting the effective contents information and the composite operation information related to the effective contents information from the feedback part, extracting effective operation information from the accepted effective contents information and the accepted composite operation information, and updating the certainty determination parameter based on the extracted effective operation information.

According to an aspect of the embodiments, a computer-readable recording medium stores an object contents search support program for causing a computer, which is capable of accessing an overall operation history database connectable to a network and accessing contents on the network, to function as an object contents search support apparatus. The object contents search support program includes the operations of displaying information on a monitor, accepting an operation input of a user to search for desired object contents information, collecting composite operation information including contents information of contents having been subjected to an operation and operation information including an operation time, registering the composite operation information in the overall operation history database, matching, when the operation input is accepted, historical records of the composite operation information having been accepted during a certain period of time against historical records of the composite operation information registered in the overall operation history database, extracting, as the object contents information, at least one item of contents information having a high certainty based on a matching result by referring to a certainty determination parameter related to the user, generating display information of the extracted object contents information, displaying the generated display information on the monitor, accepting the operation input of the user, holding the object contents information, comparing the composite operation information included in the operation input, which has been accepted after displaying the generated object contents information, with the accepted object contents information, generating effective contents information from a comparison result, accepting both the effective contents information and the composite operation information related to the effective contents information, extracting effective operation information from the accepted effective contents information and the accepted composite operation information, and updating the certainty determination parameter based on the extracted effective operation information.

BRIEF DESCRIPTION OF THE DRAWINGS

FIG. 9 depicts one example of details registered in an all operation history database.

FIG. 10 depicts one example of details registered in a per-contents operation history database.

FIGS. 11A, 11B and 11C depict examples of details of an update of matching parameters.

FIGS. 12A, 12B and 12C depict examples of details of an update of matching parameters.

FIG. 16 depicts one example of details registered in the per-contents operation history database according to the second embodiment.

FIGS. 17A, 17B and 17C depict examples of details of communication with respect to object contents determination criteria according to the second embodiment.

FIGS. 20A, 20B and 20C depict examples of details of an update of matching parameters according to the third embodiment.

FIG. 21 depicts one example of determination criteria per application according to the fourth embodiment.

FIG. 22 depicts one example of determination criteria per user according to the fourth embodiment.

FIG. 23 depicts one example of determination criteria per group, to which users belong, according to the fourth embodiment.

FIG. 26 depicts one display example of an object content information list.

The object and advantages of the embodiment discussed herein will be realized and attained by means of elements and combinations particularly pointed out in the claims.

It is to be understood that both the foregoing general description and the following detailed and the following detailed description are exemplary and only are not restrictive exemplary explanatory are not restrictive of the invention, as claimed.

DETAILED DESCRIPTION OF THE EMBODIMENTS

First Embodiment

Figure 1:
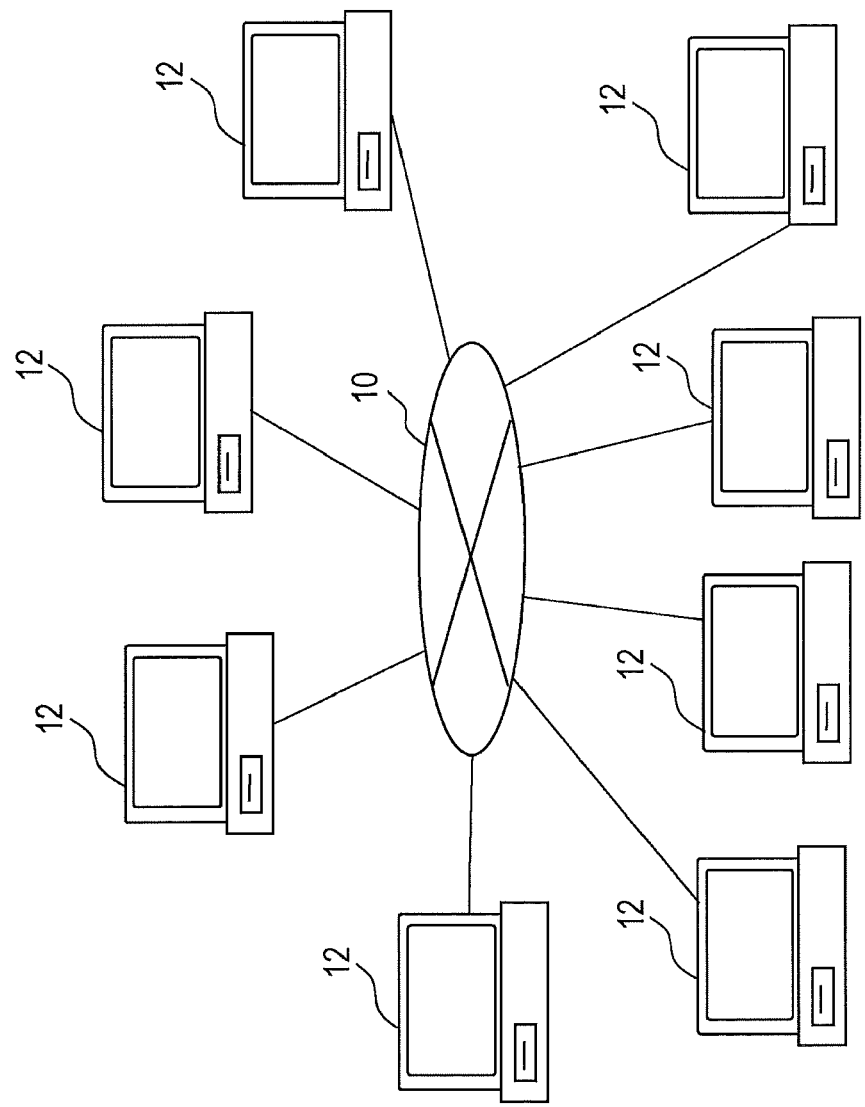
FIG. 1 is a block diagram depicting one example of a configuration of a network on which an objects content search support program operates.

Referring to FIG. 1, an object contents search support apparatus 30 (see FIG. 3) according to a first embodiment is realized with both a network 10 and an object contents search support program operated on each of computers 12 that are connected to the network 10. The object contents search support program is distributed to users in a state stored in a recording medium, such as a CD-ROM (Compact Disk Read Only Memory), a DVD-ROM (Digital Versatile Disk Read Only Memory), or a flexible disk. As an alternative, the object contents search support apparatus 30 according to the first embodiment may also be realized by downloading the object contents search support program via the network 10, and storing it in a memory of, e.g., the computer 12 on which the object contents search support program is to be run. While the computer 12 is operating with other programs, the object contents search support program runs on the computer 12 in the background of those other programs to search for contents, such as previously prepared files and URLs of previously viewed Web pages, with high accuracy.

Figure 2:
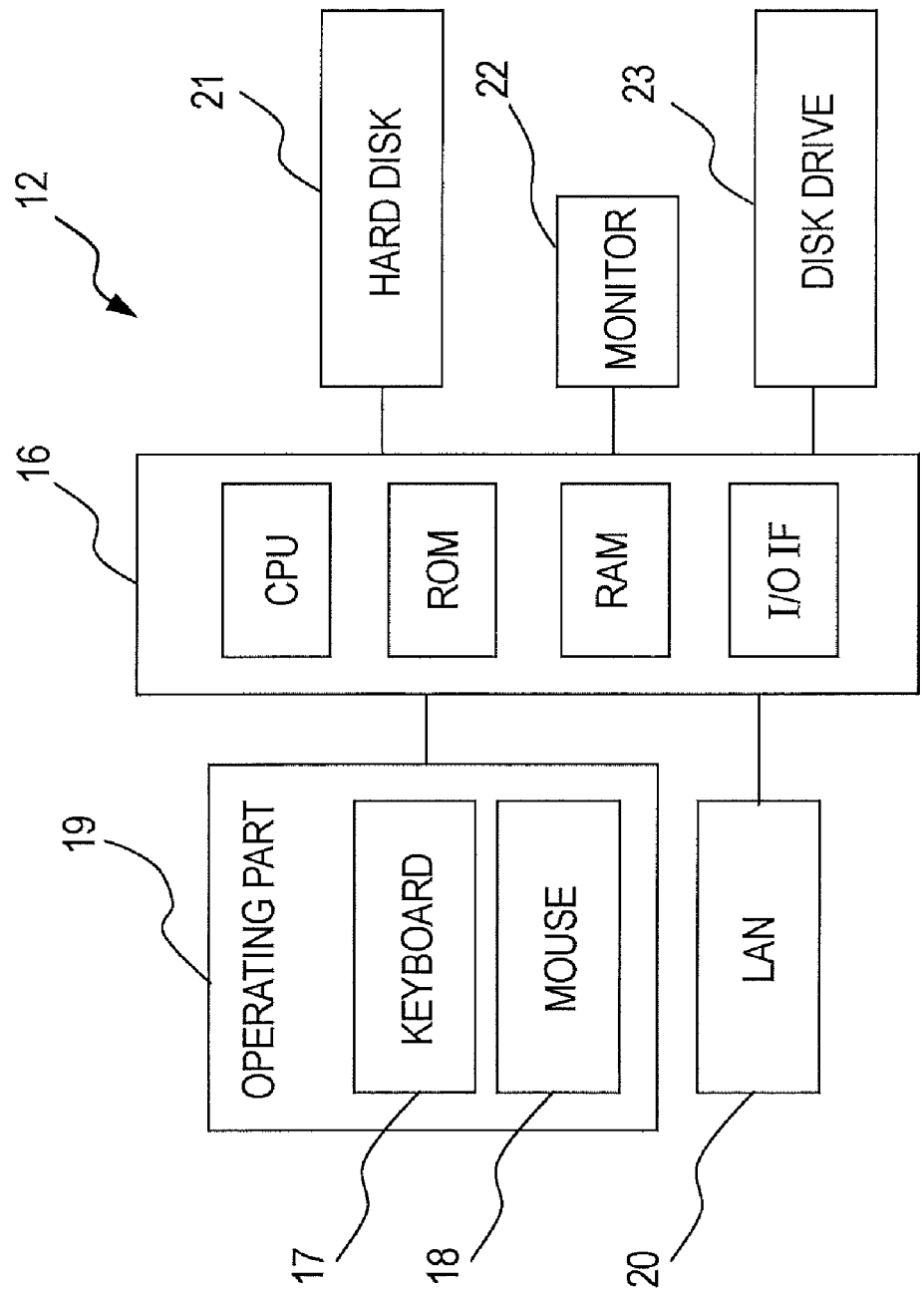
FIG. 2 is a block diagram depicting one example of a computer on which the object contents search support program operates.

As depicted in FIG. 2, hardware of the computer 12 includes, for example, a computer main unit 16 including a CPU (Central Processing Unit), a ROM (Read Only Memory), a RAM (Random Access Memory), and an I/O IF (Input/Output Interface), which are mounted on a mother board, and an operating part 19 including a keyboard 17 and a mouse 18, which are connected to the computer main unit 16 through the I/O IF. The hardware of the computer 12 further includes a LAN card 20, a hard disk 21, a monitor 22, and a disk drive 23 that is employed, for example, to install programs by using a recording medium, such as a CD-ROM or a DVD-ROM.

<Example of a Configuration of Object Contents Search Support Apparatus>

Figure 3:
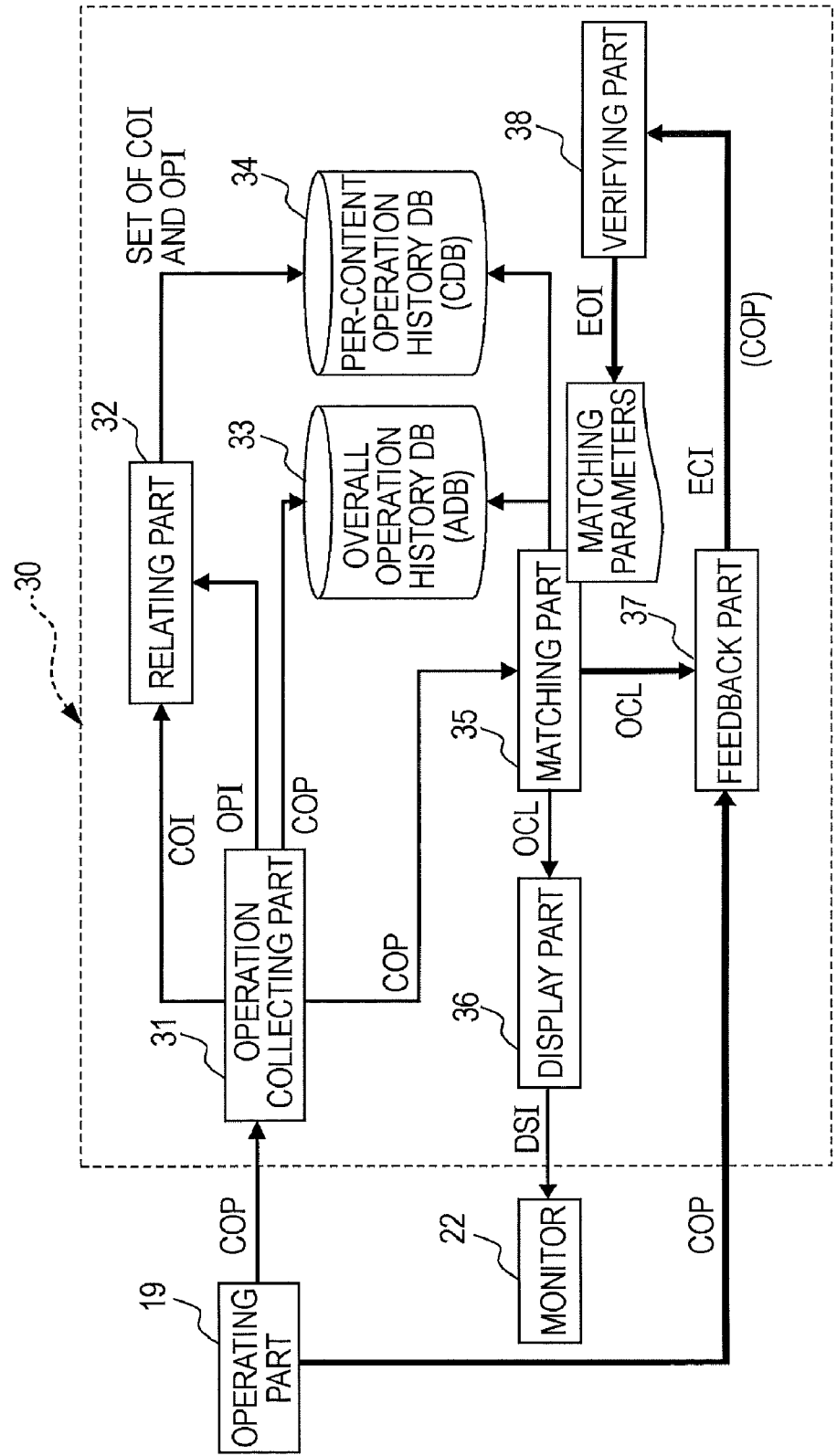
FIG. 3 is a block diagram depicting one example of a software configuration of the object contents search support program.

As depicted in FIG. 3, software of the object contents search support apparatus 30 (i.e., an object contents search support program) includes an operation collecting part (one example of an information registering function) 31 accepting an operation input from the operating part 19, collecting composite operation information COP including operation information OPI, which contains an operation time, and contents information COI, and registering the composite operation information COP in an overall operation history database (hereinafter referred to simply as an "ADB") 33, and a relating part (one example of a relating function) 32 accepting an output of the operation collecting part 31 and registering the operation information OPI per-contents in a per-contents operation history database (one example of a per-contents operation history database, hereinafter referred to simply as a "CDB") 34.

Further, the object contents search support apparatus 30 includes a matching part 35 accepting the composite operation information COP from the operation collecting part 31 and generating an object contents information list (one example of object contents information) OCL, a display part (one example of a display function) 36 accepting the object contents information list OCL, which has been generated by a matching process, from the matching part 35, generating and displaying display information on the monitor 22, and presenting the display information to a user, a feedback part (one example of a feedback function) 37 generating effective contents information ECI from the composite operation information COP and the object contents information list OCL that have been received from the matching part 35, and a verifying part (one example of a verifying function) 38 accepting the effective contents information ECI from the feedback part 37.

The operation collecting part 31 accepts an operation input whenever the operating part 19 is operated. Also, the operation collecting part 31 periodically collects operation statuses of application programs, etc., which run on the computer 12, thereby collecting the composite operation information COP, and separates the accepted composite operation information COP into the operation information OPI and the contents information COI. Herein, the composite operation information COP includes the contents information COI and the operation information OPI representing, for example, at what time (one example of an operation time) and through what operations the contents information COI has been viewed, and in what window, having what size and positioned at what location, the contents information COI has been viewed. The accepted composite operation information COP is notified (informed) to the ADB 33 and the matching part 35. The composite operation information COP from the operating part 19 is further notified to the feedback part 37. In addition, the operation information OPI and the contents information COI having been separated from each other are notified to the relating part 32.

The relating part 32 registers the obtained operation information OPI in the CDB 34 in relation to the contents information COI.

The ADB 33 is a database in which the composite operation information COP is registered on the basis of date information. FIG. 9 depicts one example of details registered in the ADB 33. In this embodiment, the ADB 33 includes items of "ID", "Date and Time of Event Occurrence", "Type", "Event", "HWND", "Title", "Module", "Active", "Left", "Top", "Height", "Width", and "State Type". The "ID" represents identification information for identifying the composite operation information COP. In this embodiment, the item "ID" is provided as an ID number assigned in order of the date and time of occurrence of the operation information OPI. The item "Date and Time of Event Occurrence" represents the date and time when the operation input has been performed on the operating part 19, or the date and time when the operation status of the application operating on the computer 12 has been collected. Note that the operation input performed on the operating part 19 and the operation of the application are also collectively called the "event". The item "Type" represents the event type. More specifically, a value "APP" indicates that the relevant composite operation information COP represents the operation status of the application. For example, the "APP" indicates that the composite operation information COP is related to the application that is started up and displayed in a window of the computer 12. A value "Mouse" indicates that the composite operation information COP is related to the operation of the mouse 18. A value "File/Dir" indicates that the composite operation information COP is related to the operation performed on a file or a directory. A value "Win" indicates that the composite operation information COP is related to the operation performed on a window. The item "Event" represents the substance of the operation actually performed. For example, a value "LBUTTON-DOWN" indicates that a left button of the mouse 18 has been clicked. A value "Changed" indicates that the file or the directly viewed or accessed by the computer 12 has been changed. A value "Active" indicates that a target window has come into an active state. The item "HWND" represents an identifier uniquely assigned to a window displayed on the computer 12. The item "Title" represents a character string displayed in a window title bar, e.g., the name of the application operating at that time, the name of the file being viewed, or the URL. The item "Module" represents the name of an execution file used to open a window. The item "Active" represents to which APP a window displayed in the most front side belongs, when the item "Type" is provided by the value "APP". In the item "Active", "true" is set for the APP displayed in the most front side, and "false" is set for the other APPs. The items "Left", "Top", "Height", and "Width" represent the size and the position of a window. The item "State Type" represents the window state. A value "Normal" indicates that a window is ordinarily displayed. A value "Minimized" indicates that a window is displayed in a minimized icon state. A value "Max" indicates that a window is displayed in a maximized state. FIG. 9 represents that the item "Title" and/or the item "Module", among all pieces of the composite operation information COP, belongs to the contents information COI and the other items belong to the operation information OPI.

The CDB 34 is an example of a content-based database constructed of the contents information COI and the operation information OPI that are sent from the relating part 32. FIG. 10 depicts one concrete example of details registered in the CDB 34. In this embodiment, the CDB 34 includes items of "ID", "Contents Access Period", "Contents Path", "Contents APP", and "Event". The item "Contents Access Period" represents a period of time from the start to the end of the operation of the application, the operation performed through the operating part 19, etc., which are related to the same contents. One example of the item "Contents Access Period" is a period of time from the start of display of a window of the relevant contents to the end of display of the window. The item "Contents Access Period" corresponds to the item "Date and Time of Event Occurrence" in the ADB 33. The item "Contents Path" represents the address, the path name, etc., which can specify the contents. The item "Contents Path" corresponds to a part of the item "Module" or the item "Title" in the ADB 33. In the case of the application, for example, the item "Contents Path" represents the place where the file under operation is registered. In the case of the Web page, the item "Contents Path" represents the URL of the Web page under viewing. The item "Contents APP" represents the name of the application that is used to open the contents. The item "Contents APP" corresponds to a part of the item "Module" or the item "Title" in the ADB 33. The item "Event" represents operation information per operation with respect to the contents that is specified by the items "Contents Access Period", "Contents Path", and "Contents APP". Data in the items "Date and Time of Event Occurrence", "Type", "Event", "Left", "Top", "Height", "Width", and "State Type" in the ADB 33 are set corresponding to sub-items "Occurrence Time", "Type", "Window Position and Size", and "Window State" in the item "Event". In the item "Type", a value "Create Wind" indicates that a window has been opened, and a value "APP" indicates that a window is started up. A value "Key=Ctrl+C" indicates that a copy operation has been performed with pressing of keys "Ctrl+C" on the keyboard 17. Other values put in FIG. 10 are the same as those described above in connection with the ADB 33, and therefore a description of those values is omitted here.

The matching part 35 compares historical records of the composite operation information COP collected during a certain period with data in the ADB 33 and the CDB 34 to check matching therebetween. And the matching part 35 extracts not only an operation pattern for which a match or similarity has been confirmed, but also corresponding object contents candidates. Further, the matching part 35 generates an object contents information list OCL, which contains at least one item of object contents information from the extracted object contents candidates by utilizing matching parameters (one example of certainty determination parameters). The generated object contents information list OCL is output to the display part 36 and the feedback part 37.

The display part 36 outputs the generated object contents information list OCL to the monitor 22 such that the object contents information list OCL is displayed on the monitor 22.

The feedback part 37 holds therein the object contents information list OCL sent from the matching part 35. Also, when the operating part 19 is operated, the feedback part 37 accumulates the composite operation information COP collected from the operating part 19. The feedback part 37 compares the composite operation information COP with the object contents information list OCL to generate effective contents information ECI on the basis of the comparison result. The effective contents information ECI and the composite operation information COP are output to the verifying part 38.

The verifying part 38 extracts effective operation information EOI from the composite operation information COP and the effective contents information ECI. The verifying part 38 updates the matching parameters on the basis of the extracted effective operation information EOI. As a result, accuracy of the matching parameters is increased and accuracy in extracting the object contents information is increased.

<Operation of Object Contents Search Support Apparatus>

Object contents search support procedures will be described below with reference to operation charts of FIGS. 4 to 8.

Figure 4:
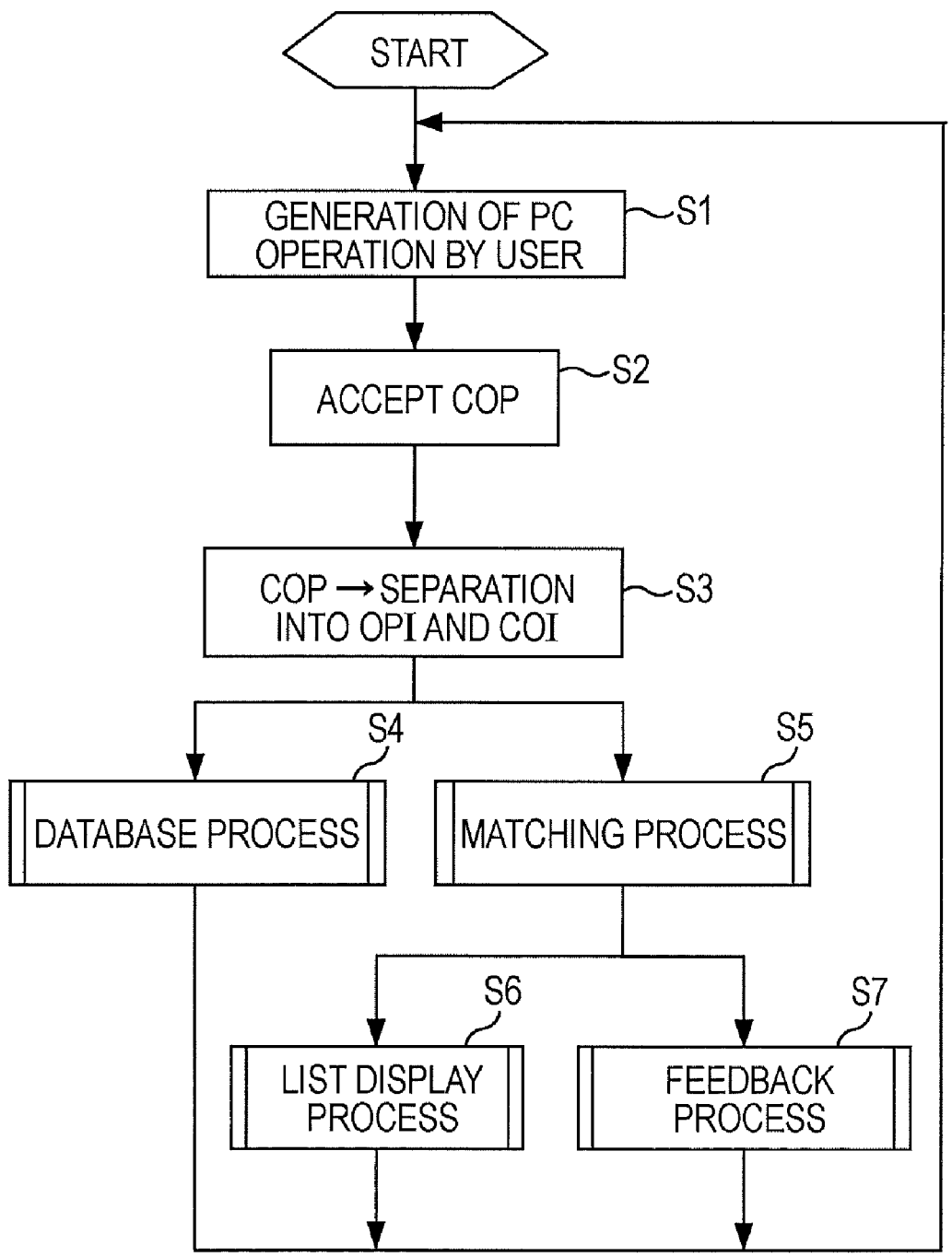
FIG. 4 is an operation chart depicting processing procedures of an object contents search support program.
Figure 5:
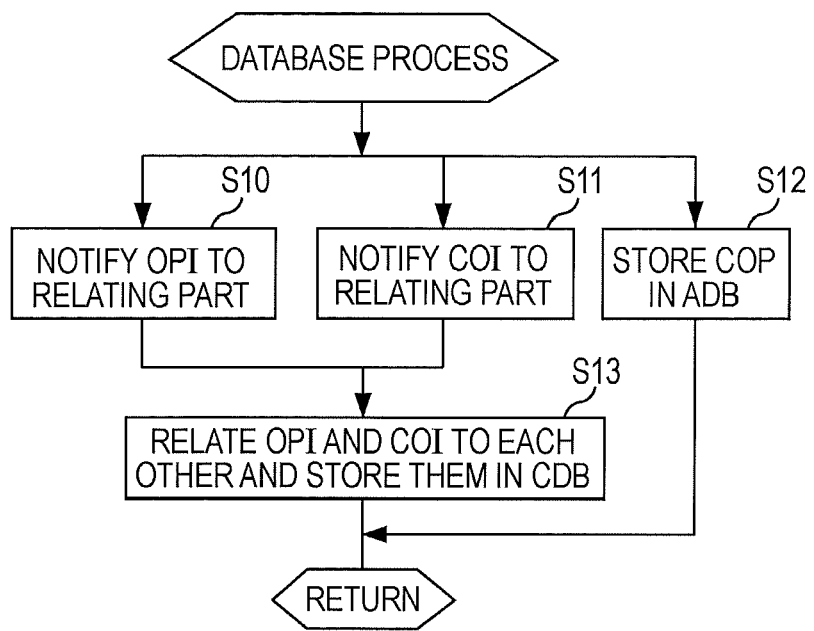
FIG. 5 is an operation chart depicting one example of procedures of a database process.
Figure 6:
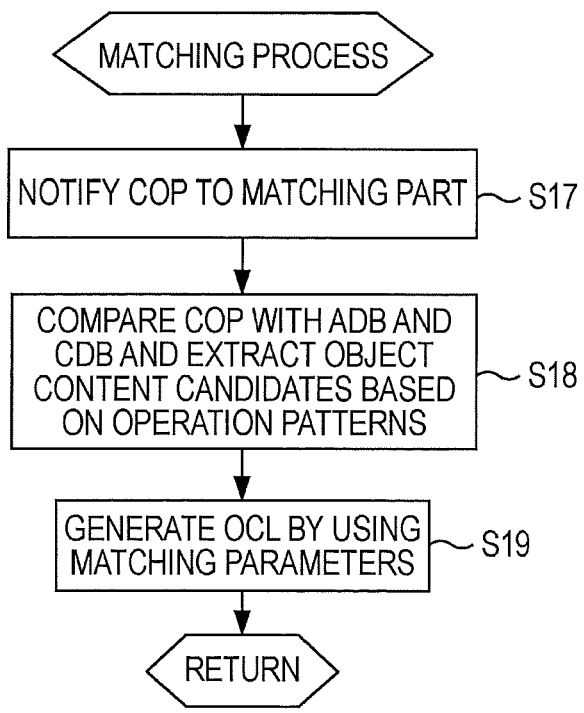
FIG. 6 is an operation chart depicting one example of procedures of a matching process.

In FIG. 4, when the program starts to operate, monitoring of an operation input to the PC and monitoring of the operation status of an application are started. When the occurrence of an event, e.g., an operation of the operating part 19, is detected (operation S1), the operation collecting part 31 collects the composite operation information COP in operation S2. More specifically, when an input is applied from the mouse 18 or the keyboard 17, the operation input is accepted. The composite operation information COP including the operation information OPI and the contents information COI, as depicted in FIG. 9, is collected. For example, information detected by an operating system (OS) (not shown), which is operating on the computer 12, may be acquired as the composite operation information COP. In operation S3, to produce per-contents operation historical records, the composite operation information COP is separated into the operation information OPI and the contents information COI by the operation collecting part 31. After the end of operation S3, the process flow is branched to operation S4 and operation S5. In operation S4, a database process depicted in FIG. 5 is executed. In operation S5, a matching process depicted in FIG. 6 is executed. After the end of the database process, the process flow returns to operation S1.

Figure 7:
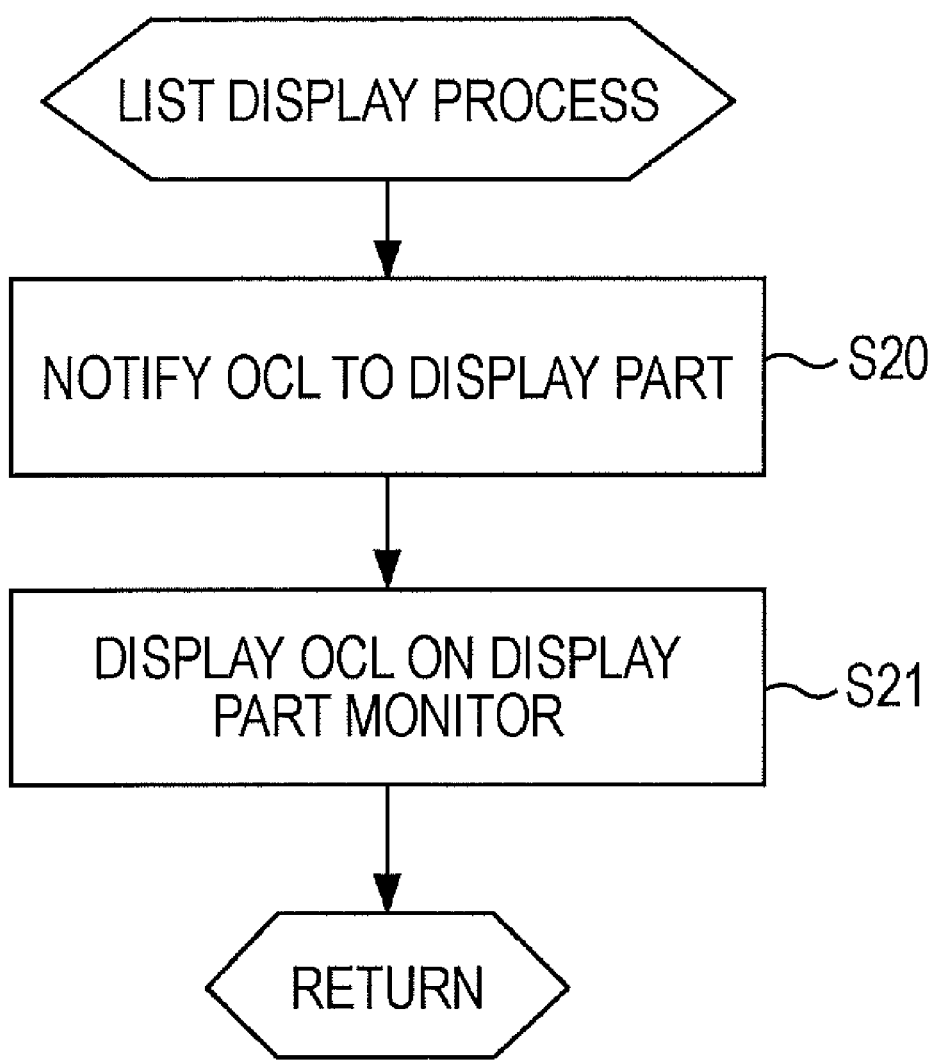
FIG. 7 is an operation chart depicting one example of procedures of a list display process.
Figure 8:
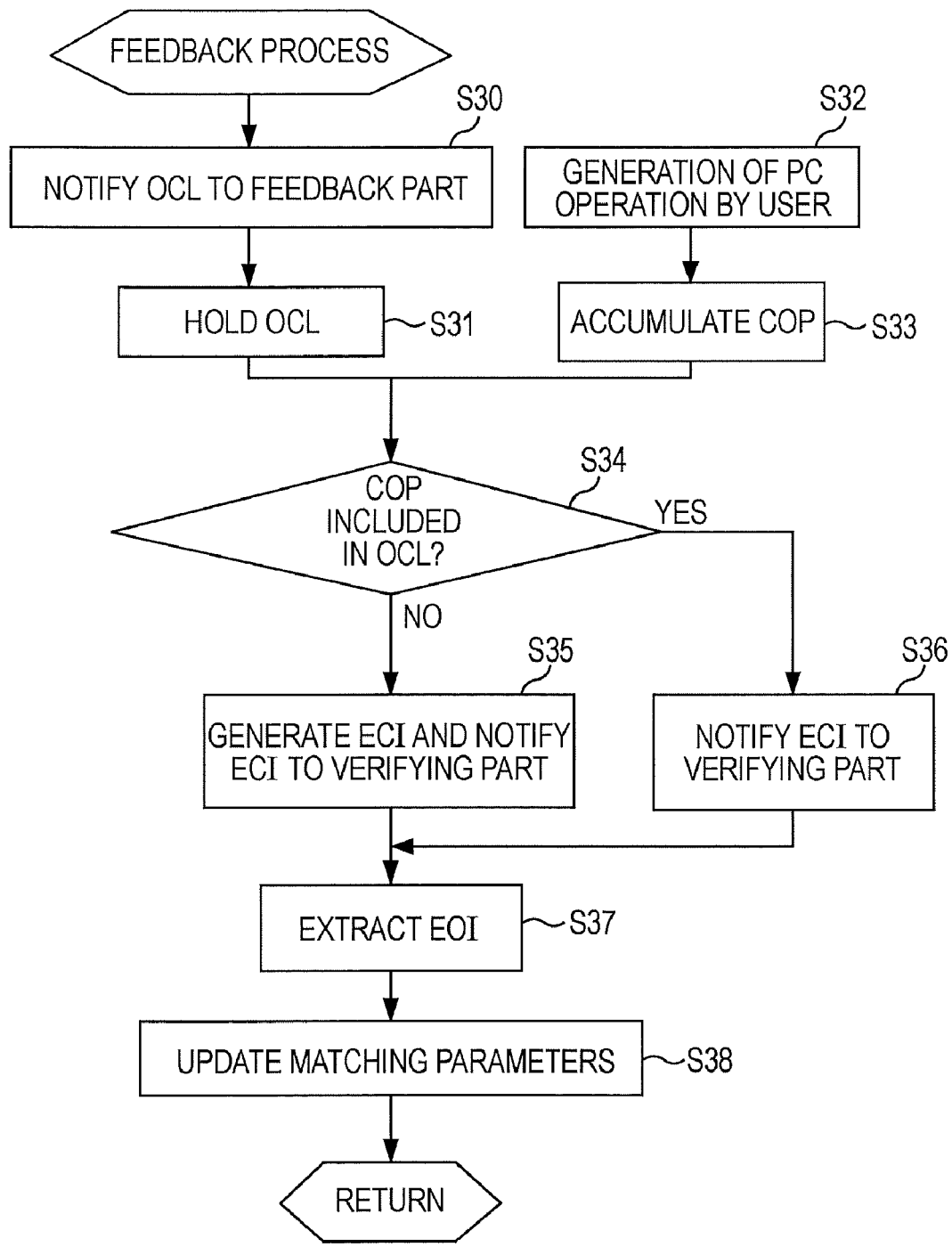
FIG. 8 is an operation chart depicting one example of procedures of a feedback process.

After the end of the matching process, the process flow is branched to operation S6 and operation S7. In operation S6, a list display process depicted in FIG. 7 is executed. In operation S7, a feedback process depicted in FIG. 8 is executed. After the end of the list display process, the process flow returns to operation S1. Also, after the end of the feedback process, the process flow returns to operation S1.

In the database process, in operation S10 and operation S11 of FIG. 5, the operation collecting part 31 notifies respectively the operation information OPI and the contents information COI, which have been separated from each other, to the relating part 32. In operation S12, the operation collecting part 31 registers the composite operation information COP in the ADB 33. In operation S13, the relating part 32 relates the operation information OPI and the contents information COI to each other, and assigns an ID to sets of composite operation information COP that can be regarded as representing a series of operations with respect to the same contents. Further, the relating part 32 registers, in the CDB 34, the sets of composite operation information COP that can be regarded as representing a series of operations corresponding to the same ID. Thereafter, the process flow returns to the processing depicted in FIG. 4. The sets of composite operation information COP regarded as representing a series of operations serve as a unit in determining a match or similarity with historical records of the notified composite operation information COP during a certain period.

In the matching process, the operation collecting part 31 notifies the composite operation information COP to the matching part 35 in operation S17 of FIG. 6. In operation S18, the matching part 35 compares historical records of the notified operation information OPI during a certain period with the information registered in the ADB 33 and the information registered in the CDB 34, and extracts matched or similar operation patterns and object contents candidates related to those operation patterns. In operation S19, the matching process is executed such that at least one object contents candidate having high certainty is further extracted from the above-mentioned object contents candidates by using the matching parameters that are set to determine certainty and the object contents information list OCL is generated. Thereafter, the process flow returns to the processing depicted in FIG. 4. The object contents information list OCL is generated through the three operations of checking the operation information OPI related to the object contents candidates with respect to the matching parameters, determining certainty for each of the object contents candidates, and extracting at least one object contents candidate having high certainty.

In the list display process, the matching part 35 notifies the object contents information list OCL to the display part 36 in operation S20 of FIG. 7. In operation S21, the display part 36 displays, on the monitor 22, the object contents information list OCL notified from the matching part 35. The desired object contents candidate is selected from the list by the user performing some input operation. Whenever the object contents information list OCL is generated, the display part 36 displays the generated object contents information list OCL at a position that does not interfere with the user's work on the monitor 22. Accordingly, the object contents search support program according to this embodiment does not require troublesome input work for a search, such as inputting of a search keyword. Upon the user just performing routine operations, such as startup of an application and selection of a file to be viewed, the object contents search support program can estimate contents desired by the user, depending on the substance of the user's operations, and can present the estimated contents.

FIG. 26 depicts one concrete example of display of the object contents information list OCL. The example of FIG. 26 depicts items of "Contents Name and Path Name", "Final Viewing Date", and "Number of Times of Viewing" for each of the object contents candidates included in the object contents information list OCL that has been generated on the basis of the substance of the user's operations at that time. When the object contents candidate is a Web page, the URL of the Web page is displayed in a column indicating the path. Also, an icon representing an application used to open the relevant contents is displayed in a column of "Contents Name and Path Name".

In the feedback process, the matching part 35 notifies the object contents information list OCL to the feedback part 37 in operation S30 of FIG. 8. In operation S31, the feedback part 37 holds the notified object contents information list OCL. On the other hand, when the user performs some operations through the operating part 19 (operation S32), the operating part 19 notifies the composite operation information COP relating to the operation, which has been performed after displaying the object contents information list OCL, to the feedback part 37. The feedback part 37 accumulates the composite operation information COP notified from the operating part 19 in operation S33. This embodiment represents the case where the operating part 19 notifies the composite operation information COP relating to the operation, which has been performed after displaying the object contents information list OCL on the monitor 22, to the feedback part 37. However, such a process may be modified as follows. The operation collecting part 31 accepts the composite operation information COP from the operating part 19. Then, the operation collecting part 31 determines whether the accepted composite operation information COP represents an operation which is performed after the object contents information list OCL has been displayed on the monitor 22. If the operation collecting part 31 determines that the composite operation information COP accepted from the operating part 19 represents an operation that is performed after the object contents information list OCL has been displayed on the monitor 22, the operation collecting part 31 notifies the accepted composite operation information COP to the relating part 32 and the matching part 35, as well as to the feedback part 37. After the end of operation S31 or operation S33, the processing flow shifts to operation S34. In operation S34, the feedback part 37 determines whether the contents information COI included in the accumulated composite operation information COP exists or not in the object contents information list OCL held in the feedback part 37 at that time.

If the feedback part 37 determines that the relevant contents information COI does not exist in the object contents information list OCL held therein, the process flow shifts from operations S34 to S35. In operation S35, effective object contents information (hereinafter referred to as "effective contents information ECI") is generated by referring to the historical records of the accumulated composite operation information COP. Further, in operation S35, the generated effective contents information ECI is notified to the verifying part 38 together with the composite operation information COP related to the effective contents information ECI.

If the feedback part 37 determines that the relevant contents information COI exists in the object contents information list OCL held therein, the process flow shifts from operations S34 to S36. In operation S36, the feedback part 37 regards that the contents information COI having been determined to exist in the object contents information list OCL provides the effective contents information ECI. Then, the feedback part 37 generates the effective contents information ECI on the basis of the composite operation information COP related to the contents information COI that has been determined to be effective, and notifies the generated effective contents information ECI to the verifying part 38. After the end of the processing described above, the process flow shifts to operation S37. In operation S37, the verifying part 38 extracts effective operation information EOI from the effective contents information ECI that has been accepted from the feedback part 37. The verifying part 38 updates the matching parameters on the basis of the extracted effective operation information EOI.

Examples of update of the matching parameters will be described with reference to FIGS. 11A to 11C and 12A to 12C. FIGS. 11A to 11C represent an example that the contents information COI included in the composite operation information COP relating to the operation, which has been performed after displaying the object contents information list OCL, exists in the object contents information list OCL. More specifically, FIG. 11A depicts one example of the matching parameters before update (reflection), and FIG. 11C depicts one example of the matching parameters after update (reflection). In this embodiment, the matching parameters are each given with a score set for each event name indicating the substance of the operation. The score is set to a larger value for the operation having a higher degree of importance. In other words, the certainty of the object contents increases as a total value of the scores increases. FIG. 11B depicts one example of the composite operation information COP relating to the operation that has been performed after displaying the object contents information list OCL. In the example of FIGS. 11A to 11C, the contents information COI included in the composite operation information COP relating to the operation, which has been performed after displaying the object contents information list OCL, exists in the object contents information list OCL. Therefore, the feedback part 37 determines that the relevant contents information COI provides the effective contents information ECI. FIG. 11B represents the case where a Web page having the URL of "http://-/2.htm" is viewed by using browser software (Internet Explore (registered trademark)), a copy operation (Key=Ctrl+C) is performed during the viewing, and a copy of the matter titled "hogehoge" to a clipboard is effectively performed. The feedback part 37 notifies, as the effective contents information ECI, the composite operation information COP including the operation information OPI, which indicates that the copy operation to the clipboard has been performed, to the verifying part 38. The verifying part 38 extracts the operation information OPI from the effective contents information ECI notified from the feedback part 37, thus generating the effective operation information EOI. On the basis of the generated effective operation information EOI, the verifying part 38 increments the score of the parameter "Copy to Clipboard", which is included in the matching parameters, by one.

FIGS. 12A to 12C represent an example that the contents information COI included in the composite operation information COP relating to the operation, which has been performed after displaying the object contents information list OCL, does not exist in the object contents information list OCL. More specifically, FIG. 12A depicts one example of the matching parameters before update (reflection). FIG. 12C depicts one example of the matching parameters after update (reflection). FIG. 12B depicts an example in which the operation information OPI representing that the user has clicked the left button of the mouse (LBUTTONDOWN) in accordance with an item "Chat Client" and has viewed contents information "http://-/2.htm", is obtained as the composite operation information COP relating to the user's operation that has been performed after displaying the object contents information list OCL. In this example, the contents information "http://-/2.htm" does not exist in the object contents information list OCL. Therefore, the feedback part 37 notifies, as the effective contents information ECI, the composite operation information COP, which has been obtained after displaying the object contents information list OCL, to the verifying part 38. The verifying part 38 extracts, as the effective operation information EOI, the operation information OPI indicating startup from Chat Client on the basis of the effective contents information ECI notified from the feedback part 37. On the basis of the extracted effective operation information EOI, the verifying part 38 increments the score of the parameter "Startup from Chat", which is included in the matching parameters, by one.

Thus, in this embodiment, when the feedback part 37 accepts the composite operation information COP after displaying the object contents information list OCL that has been extracted by using the matching parameters, the processing is executed as follows; 1) the object contents information list OCL and the composite operation information COP are compared with each other, 2) the feedback part 37 generates the effective contents information ECI in accordance with the comparison result, 3) the verifying part 38 accepts the generated effective contents information ECI and extracts the effective operation information EOI related to the effective contents information ECI, and 4) the matching parameters are updated in accordance with the extracted effective operation information EOI. Accordingly, the matching parameters are updated in attributes related to the user. As a result, the object contents desired by the user can be searched for with high accuracy.

Further, since the relating part 32 registers the operation information OPI and the contents information COI, having been separated from each other, in the CDB 34 in a related manner, a processing rate can be increased in comparison with the case of reading out data in the ADB 33 and generating the operation information per contents.

Second Embodiment

Figure 13:
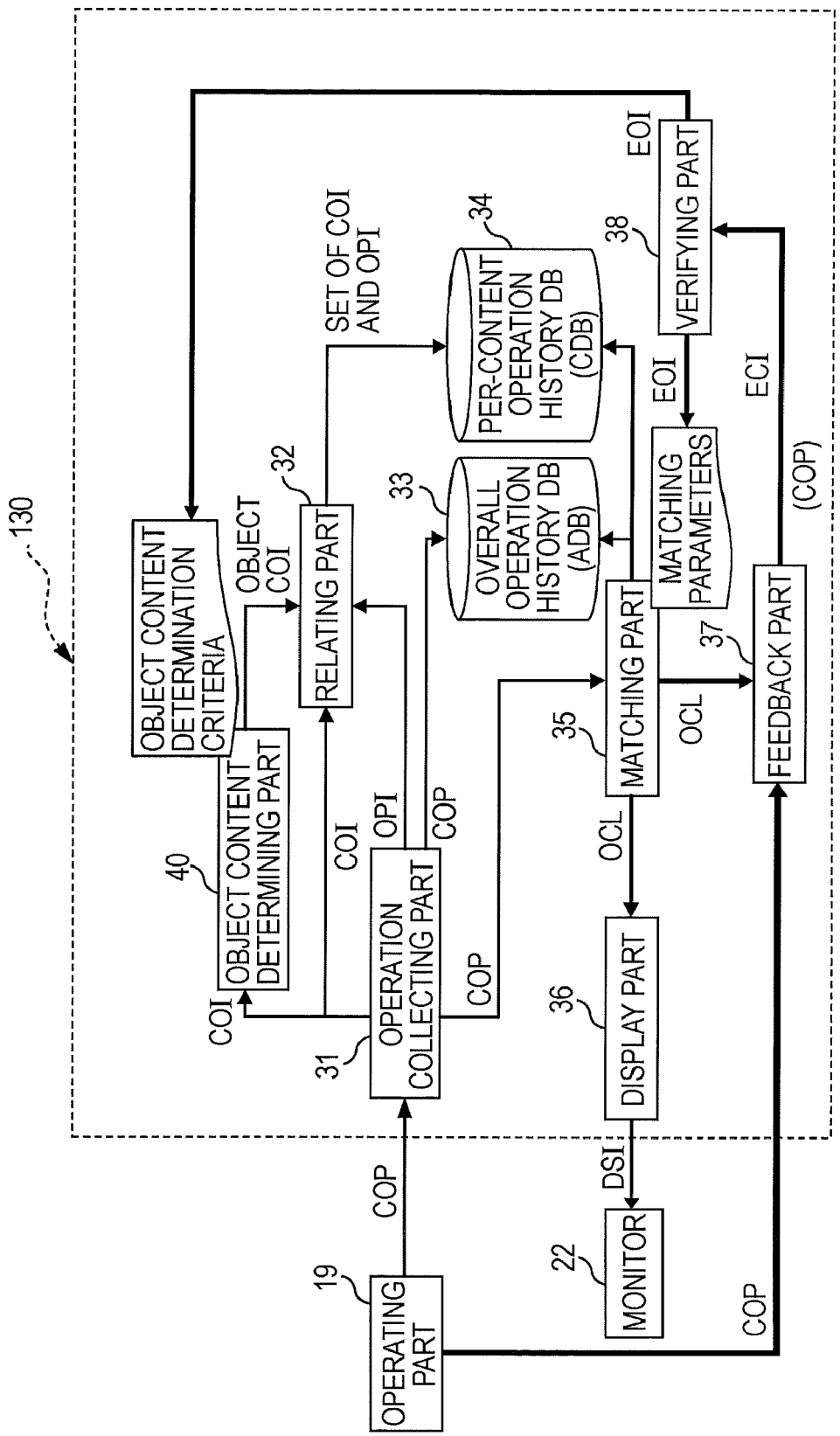
FIG. 13 is a block diagram depicting one example of a software configuration of an object contents search support apparatus according to the second embodiment.

In a second embodiment, as depicted in FIG. 13, an object contents search support apparatus 130 further includes an object contents determining part (one example of an object contents determining function) 40. In other words, the object contents search support apparatus 130 according to the second embodiment is constituted by adding the object contents determining part 40 to the object contents search support apparatus 30, depicted in FIG. 3, according to the first embodiment.

The object contents determining part 40 accepts the contents information COI from the operation collecting part 31 and the object contents determining part 40 determines, on the basis of object contents determination criteria, whether the accepted contents information is to be the object contents or not. If the object contents determining part 40 determines that the accepted contents information is to be the object contents, it sets a flag indicating such a determination.

The relating part 32 registers, in the CDB 34, the contents information COI in relation to the operation information OPI together with the flag.

Further, when the effective operation information EOI is extracted by the verifying part 38, the object contents determination criteria are updated on the basis of the effective operation information EOI.

Figure 14:
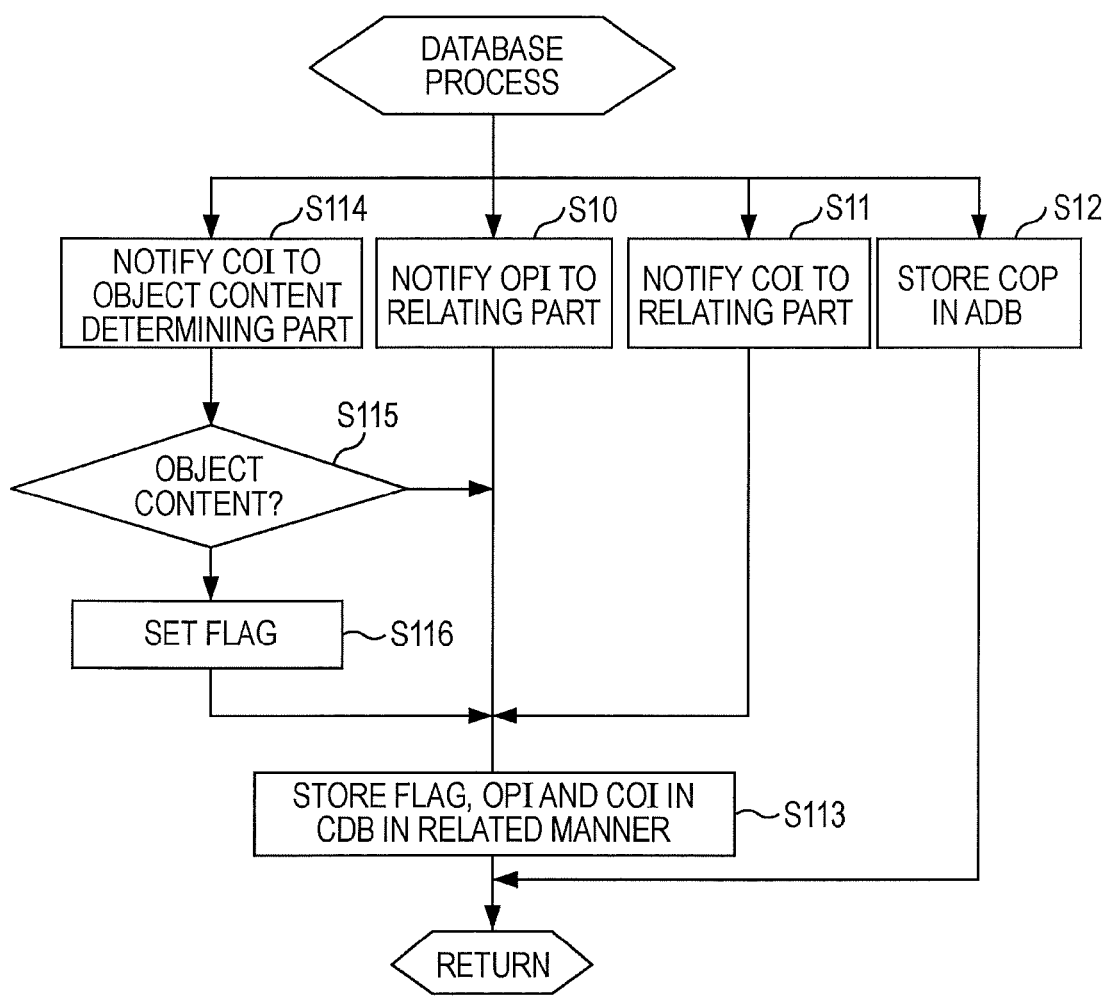
FIG. 14 is an operation chart depicting one example of procedures of a database process according to the second embodiment.
Figure 15:
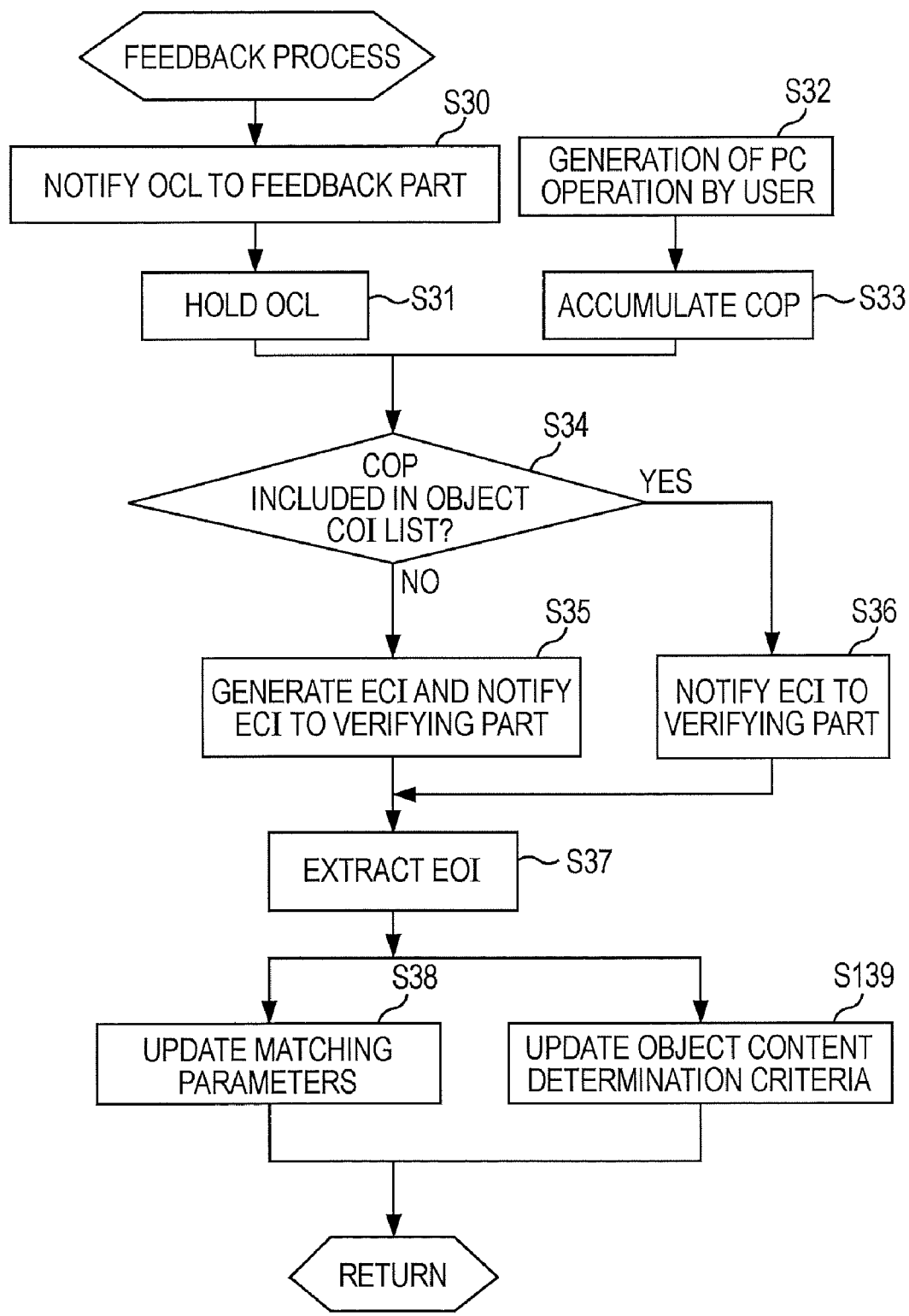
FIG. 15 is an operation chart depicting one example of procedures of a feedback process according to the second embodiment.

FIGS. 14 and 15 depict the above-described operation of the second embodiment. In a database process depicted in FIG. 14, the operation collecting part 31 notifies the operation information OPI and the contents information COI, which have been separated from the composite operation information COP, to the relating part 32 in operation S10 and operation S11, respectively, and further notifies the contents information COI to the object contents determining part 40 in operation S114. In operation S115, the object contents determining part 40 determines, on the basis of the object contents determination criteria, whether the accepted contents information COI is to be the object contents or not. If the object contents determining part 40 determines that the accepted contents information is to be the object contents, it shifts to operation S116 and sets the flag indicating such determination. In operation S113, the relating part 32 registers, in the CDB 34, the flag, the operation information OPI, and the contents information COI in a related manner.

FIG. 16 depicts a concrete example of details registered in the CDB 34 according to the second embodiment. In the example of FIG. 16, an item "Object Flag" is newly added to the items, depicted in FIG. 10, which are registered in the CDB 34 according to the first embodiment. In the item "Object Flag", "True" is a flag indicating that the accepted contents information has been determined to be the object contents, and "False" is a flag indicating that the accepted contents information has been determined to be not the object contents.

In a feedback process, processing of operation S139 is added to the feedback process depicted in FIG. 8. When the verifying part 38 extracts the effective operation information EOI in operation S37 of FIG. 15, the object contents determining part 40 updates the object contents determination criteria on the basis of the effective operation information EOI in operation S139.

One concrete example of an update of the object contents determination criteria will be described with reference to FIGS. 17A to 17C. FIG. 17A depicts one example of the object contents determination criteria before update (reflection), and FIG. 17C depicts one example of the object contents determination criteria after update (reflection). With the object contents determination criteria, the accepted contents information is determined to be the object contents in consideration of, e.g., a display time of contents and frequency of some operation.

While the object contents determination criteria have the same default values as the matching parameters in the second embodiment, the default values may differ between them. It is to be, however, noted that the default values become different between them as the update is repeated. The object contents determination criteria are each given with a score set for each event name indicating the substance of the operation. The score is set to a larger value for the operation having a higher degree of importance. In other words, the certainty of the object contents increases as a total value of the scores increases. FIG. 17B depicts one example of the effective operation information EOI. In the example of FIGS. 17A to 17C, a copy operation to the clipboard is extracted as the effective operation information EOI, and the score of the parameter "Copy to Clipboard", which is included in the matching parameters, is incremented by one.

Thus, according to the second embodiment, the object contents can be quickly extracted by determining on the basis of the object contents determination criteria whether the contents information collected by the object contents determining part 40 is to be the object contents. Further, accuracy of the object contents determination criteria can be increased and the object contents information desired by the user can be searched for with higher accuracy by updating the object contents determination criteria on the basis of the effective operation information EOI when it is determined on the basis of the object contents determination criteria whether the contents information collected by the object contents determining part 40 is to be the object contents or not.

Third Embodiment

Figure 18:
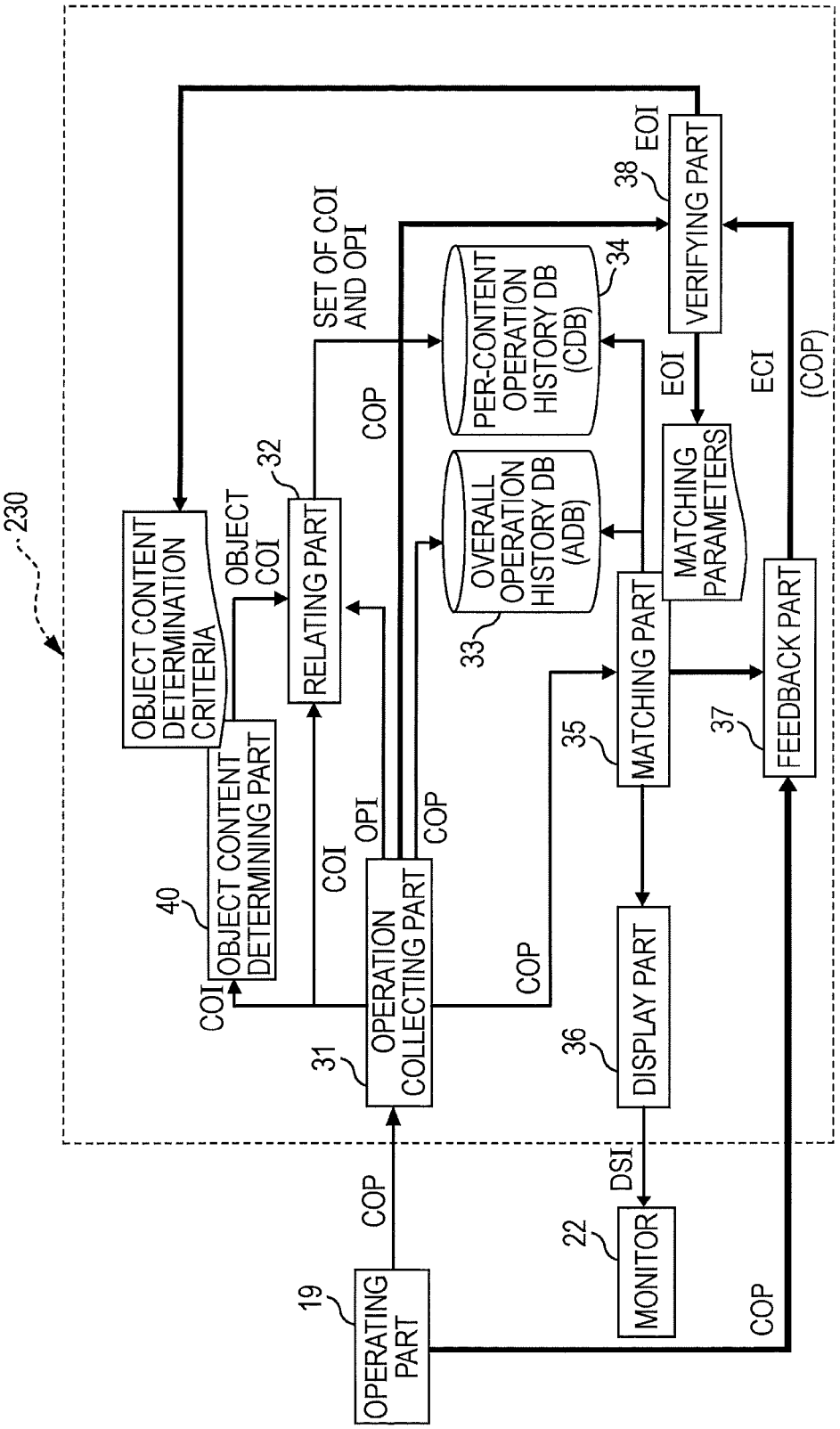
FIG. 18 is a block diagram depicting one example of a software configuration of an object contents search support apparatus according to the third embodiment.

As depicted in FIG. 18, a third embodiment differs from the second embodiment in that, in an object contents search support apparatus 230, the operation collecting part 31 notifies the composite operation information COP to the verifying part 38 as well.

Figure 19:
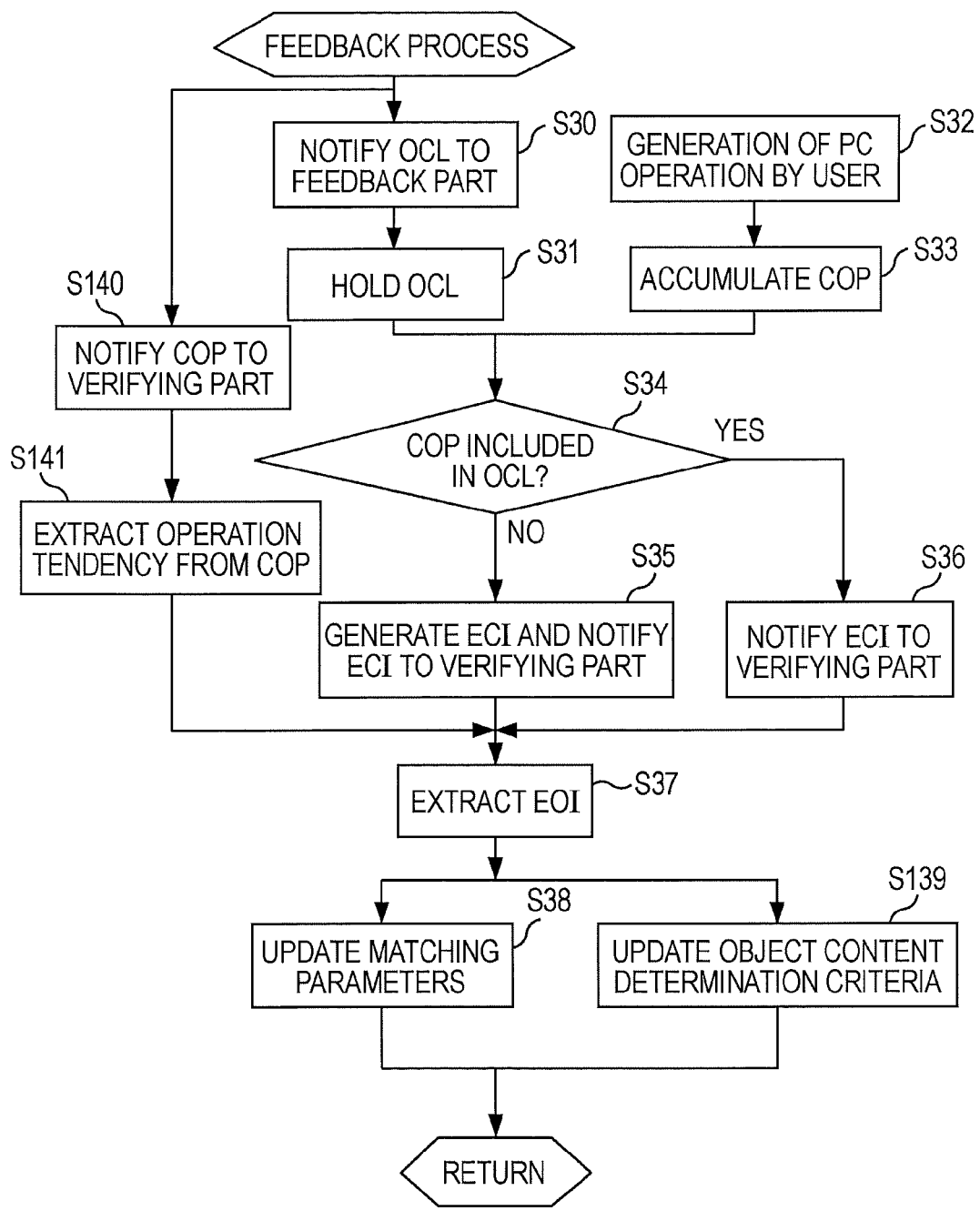
FIG. 19 is an operation chart depicting one example of procedures of a feedback process according to a third embodiment.

Referring to FIG. 19, in a feedback process, when the operation collecting part 31 collects an operation event from the operating part 19, it notifies the composite operation information COP to the verifying part 38 in operation S140. In operation S141, the verifying part 38 extracts a tendency of a user's operations from the composite operation information COP. More specifically, the verifying part 38 extracts the operation from the operation information OPI in the composite operation information COP, which has been performed at higher frequency, as one representing the operation tendency. For example, to check respective operation tendencies of a user who employs the keyboard 17 more frequently and a user who employs the mouse 18 more frequently, the numbers of times at which the keyboard 17 and the mouse 18 have been operated are counted and stored to extract significance from the counted numbers. In operation S37, the effective operation information EOI is extracted from the extracted operation tendency. The object contents determination criteria and the matching parameters are updated on the basis of the effective operation information EOI.

One concrete example of update of the matching parameters will be described with reference to FIGS. 20A to 20C. FIG. 20A depicts one example of the matching parameters before update (reflection), and FIG. 20C depicts one example of the matching parameters after update (reflection). Also, FIG. 20B depicts a counter used to check the operation tendency. The counter counts up the number of times each of listed operations is performed. It is seen, by way of example, from FIG. 20B that the keyboard is more frequently operated than the mouse. Therefore, the keyboard operation is extracted as the effective operation information EOI, and the score of "Keyboard Input" in the matching parameters is increased twice (doubled) in the verifying part 38.

Thus, by updating the matching parameters and the object contents determination criteria on the basis of the user's operation tendency, a larger weight is assigned to the operation, which is more effective in specifying the object contents, corresponding to the user's operation tendency. Accordingly, accuracy of both the matching parameters and the object contents determination criteria can be further increased and the object contents information desired by the user can be searched for with even higher accuracy.

Fourth Embodiment

In the three embodiments described above, the matching parameters and the object contents determination criteria are uniquely set per computer operated, but they may be more finely set depending on various attributes.

For example, FIG. 21 depicts the case where the matching parameters and the object contents determination criteria are set per application. Also, FIG. 22 depicts the case where the matching parameters and the object contents determination criteria are set per user. Further, FIG. 23 depicts the case where the matching parameters and the object contents determination criteria are set per group to which users belong (e.g., for each group of clerical staff and technical staff). The group to which users belong may be set to another type of group representing, e.g., an industrial field or a district.

Thus, by setting the matching parameters and the object contents determination criteria per user's attribute or per application, the types of operations more frequently performed depending on user's jobs and/or main works and the types of operations more frequently performed depending on applications are reflected on respective scores of the matching parameters and the object contents determination criteria. Therefore, even when the same operations are performed on computers, different ones among those operations are determined to be effective depending on users operating the computers or the applications running on the computers. In other words, accuracy of both the matching parameters and the object contents determination criteria can be further increased and the object contents information desired by the user can be searched for with even higher accuracy. Note that user attributes may be finely set just for either the matching parameters or the object contents determination criteria.

Fifth Embodiment

Figure 24:
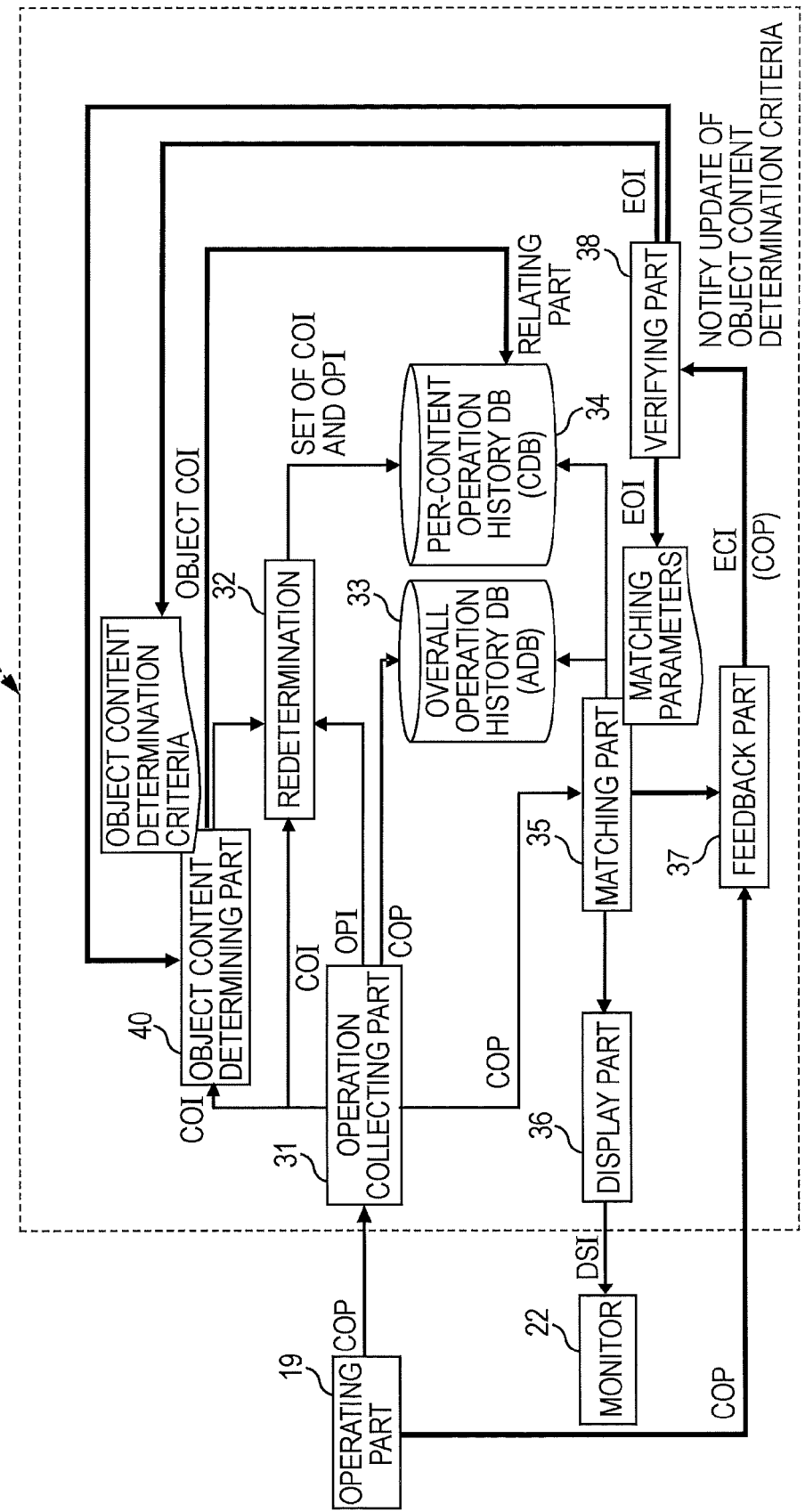
FIG. 24 is a block diagram depicting one example of a software configuration of an object contents search support program according to a fifth embodiment.

In an object contents search support apparatus 330 according to a fifth embodiment, as depicted in FIG. 24, when the verifying part 38 updates the object contents determination criteria, the verifying part 38 notifies the update of the object contents determination criteria to the object contents determining part 40, and the object contents determining part 40 determines again the flag indicating the object contents information registered in the CDB 34.

Figure 25:
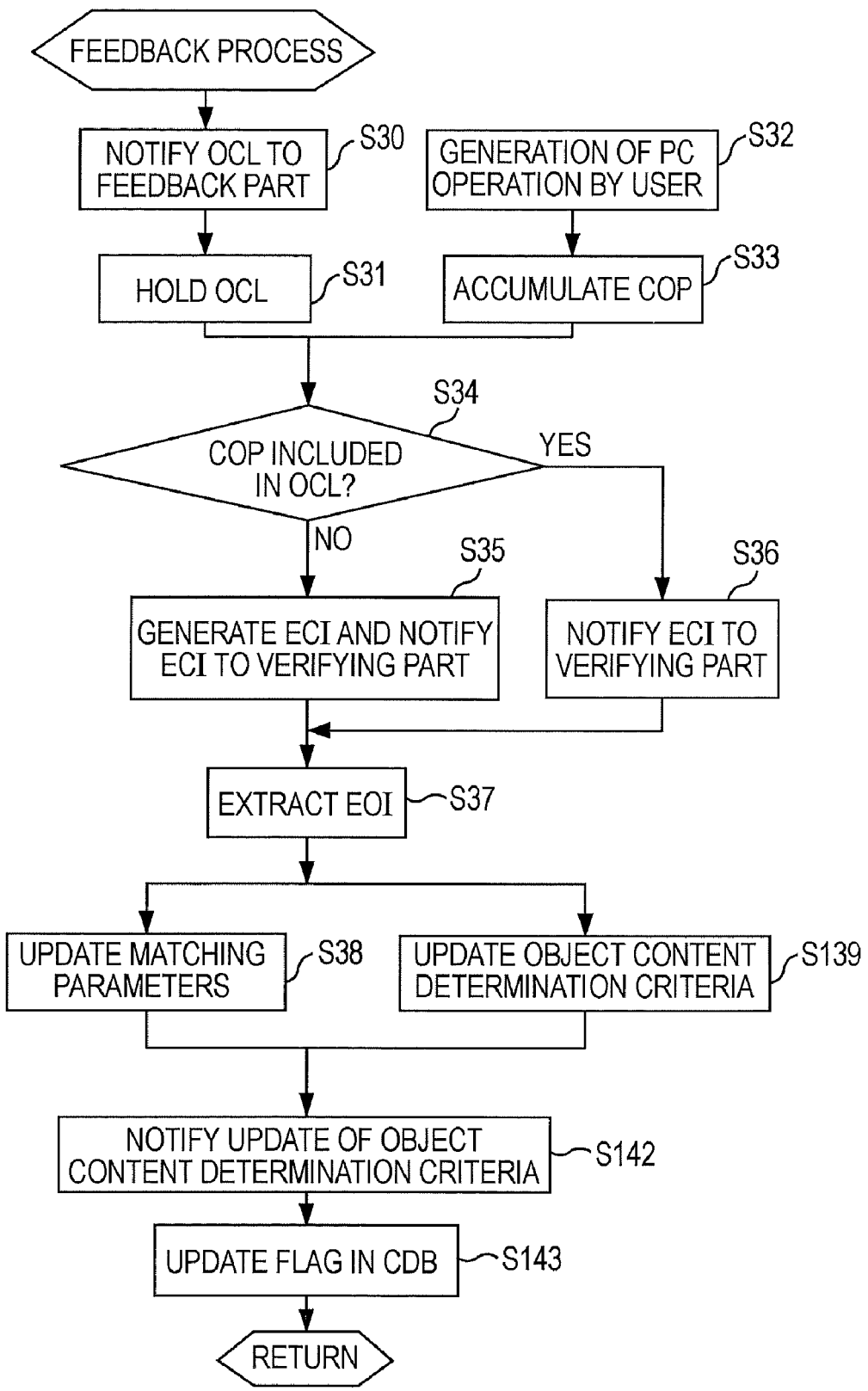
FIG. 25 is an operation chart depicting one example of procedures of a feedback process according to the fifth embodiment.

Referring to FIG. 25, in a feedback process according to the fifth embodiment, when the object contents determination criteria are updated in operation S139, the process flow shifts to operation S142, in which the verifying part 38 notifies the update of the object contents determination criteria to the object contents determining part 40. In operation S143, the object contents determining part 40 updates, on the basis of the updated object contents determination criteria, the flag indicating the object contents information in the CDB 34. As a result, accuracy of the object contents determination criteria can be further increased and the object contents information desired by the user can be searched for with even higher accuracy.

Other Embodiments (a) In the above-described embodiments, all the components are disposed on the computer operated by the user. However, when the matching parameters and the object contents determination criteria are set depending on per industrial field, for example, the matching part and the object contents determining part may be disposed on a server such that the matching parameters and the object contents determination criteria are updated depending on operations by a plurality of users who are connected to the server. In that case, the overall operation history database and the per-contents operation history database are preferably disposed on the client side because those databases include personal information, etc.

(b) In the above-described embodiments, the object contents search support operation is performed in the computer connected to the network. However, the object contents search support operation can also be performed in an off-line computer not connected to the network.

(c) While, in the above-described embodiments, the two databases ADB 33 and the CDB 34 are disposed to store the operation information, only the ADB 33 storing the composite operation information COP may be disposed to perform the object contents search support operation. However, such a modification accompanies with a risk that the load of the CPU is increased and the processing time is prolonged.

(d) While, in the above-described embodiments, the relating part is disposed to relate the operation information OPI and the contents information COI, having been separated, to each other, the relating part is not always required to be disposed. However, such a modification accompanies with a risk that the processing time is prolonged because of the necessity of referring to the ADB 33 and relating the operation information OPI and the contents information COI to each other in the matching process, for example.

The present embodiment discussed herein has been described with respect to one or more specific embodiments. However, it is to be understood that the embodiment discussed herein is not limited to the specific embodiments, and many modifications to the embodiments are possible within the scope of the embodiment discussed herein, which is defined in the appended claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A non-transitory computer-readable recording medium storing an object contents search support program for causing a computer, which is configured to access an overall operation history database connectable to a network and access contents on the network, to perform:
    displaying information on a monitor;
    accepting an operation input of a user to search for desired object contents information;
    collecting composite operation information including contents information indicating the contents having been subjected to an operation from among a plurality of operations and operation information including an operation time;
    registering the composite operation information in the overall operation history database by separating the composite operation information into the operation information and the contents information, relating the separated operation information and the separated contents information to each other, and registering the contents information and the operation information in a per-contents operation history database based on the relating of the separated operation information and the separated contents information;
    matching, when the operation input is accepted, historical records of the composite operation information having been accepted during a certain period of time against the historical records of the composite operation information registered in the overall operation history database;
    extracting, as the object contents information, at least one item of contents information having a high certainty based on a matching result by referring to a certainty determination parameter related to the user;
    generating display information of the extracted object contents information;
    displaying the generated display information on the monitor;
    accepting the operation input of the user;
    holding the object contents information;
    comparing the composite operation information included in the operation input, which has been accepted after displaying the generated display information, with the operation input of the user;
    generating effective contents information from a comparison result;
    accepting both the effective contents information and the composite operation information related to the effective contents information;
    extracting effective operation information from the accepted effective contents information and the accepted composite operation information;
    updating the certainty determination parameter based on the extracted effective operation information;
    accepting the contents information obtained with the registering;
    determining, based on a predetermined object contents determination criterion, whether the accepted contents information is the object contents information; and
    informing, in the relating, the contents information obtained with the registering and a flag indicating whether or not the accepted contents information is the object contents information,
    wherein the relating includes registering the contents information, the operation information, and the flag in the per-contents operation history database based on the related contents information.

2. The non-transitory computer-readable recording medium storing an object contents search support program according to claim 1, wherein the updating further includes:
    updating the predetermined object contents determination criterion based on the effective operation information.

3. The non-transitory computer-readable recording medium storing an object contents search support program according to claim 1, wherein the updating further includes:
    judging an operation tendency of the user from the composite operation information stored in the overall operation history database, and
    updating at least one of the object contents determination criterion and the certainty determination parameter depending on the judged operation tendency.

4. The non-transitory computer-readable recording medium storing an object contents search support program according to claim 1, wherein the object contents search support program further causes the computer to perform:
    managing the object contents determination criterion per contents; and
    at the updating, updating the object contents determination criterion per contents based on the effective operation information.

5. The non-transitory computer-readable recording medium storing an object contents search support program according to claim 2, wherein the object contents search support program further causes the computer to perform:
    managing the object contents determination criterion per contents; and
    at the updating, updating the object contents determination criterion per contents based on the effective operation information.

6. The non-transitory computer-readable recording medium storing an object contents search support program according to claim 1, wherein the object contents search support program further causes the computer to perform:
    managing the object contents determination criterion per application related to the contents; and at the updating, updating the object contents determination criterion per application based on the effective operation information.

7. The non-transitory computer-readable recording medium storing an object contents search support program according to claim 2, wherein the object contents search support program further causes the computer to perform:
managing the object contents determination criterion per application related to the contents; and
at the updating, updating the object contents determination criterion per application based on the effective operation information.

8. The non-transitory computer-readable recording medium storing an object contents search support program according to claim 1, wherein the object contents search support program further causes the computer to perform:
managing the object contents determination criterion per user; and
at the updating, updating the object contents determination criterion per user based on the effective operation information.

9. The non-transitory computer-readable recording medium storing an object contents search support program according to claim 2, wherein the object contents search support program further causes the computer to perform:
managing the object contents determination criterion per user; and
at the updating, updating the object contents determination criterion per user based on the effective operation information.

10. The non-transitory computer-readable recording medium storing an object contents search support program according to claim 1, wherein the object contents search support program further causes the computer to perform:
managing the object contents determination criterion per group to which the user belongs; and
at the updating, updating the object contents determination criterion per user group based on the effective operation information.

11. The non-transitory computer-readable recording medium storing an object contents search support program according to claim 2, wherein the object contents search support program further causes the computer to perform:
managing the object contents determination criterion per group to which the user belongs; and
at the updating, updating the object contents determination criterion per user group based on the effective operation information.

12. The non-transitory computer-readable recording medium storing an object contents search support program according to claim 1, wherein the object contents search support program further causes the computer to perform:
managing the certainty determination parameter per contents; and
at the updating, updating the certainty determination parameter per contents based on the effective operation information.

13. The non-transitory computer-readable recording medium storing an object contents search support program according to claim 1, wherein the object contents search support program further causes the computer to perform:
managing the certainty determination parameter per application related to the contents; and
at the updating, updating the certainty determination parameter per application based on the effective operation information.

14. The non-transitory computer-readable recording medium storing an object contents search support program according to claim 1, wherein the object contents search support program further causes the computer to perform:
managing the certainty determination parameter per user; and
at the updating, updating the certainty determination parameter per user based on the effective operation information.

15. The non-transitory computer-readable recording medium storing an object contents search support program according to claim 1, the object contents search support program further causing the computer to perform:
managing the certainty determination parameter per group to which the user belongs; and
at the updating, updating the certainty determination parameter per user group on the basis of the effective operation information.

16. The non-transitory computer-readable recording medium storing an object contents search support program according to claim 1, wherein
the updating further includes
updating data in the per-content operation history database after determining again the data based on the updated object contents determination criterion.

17. An object contents search support method for a computer, which is configured to access an overall operation history database, to be connected to a network, and to access contents on the network, the method comprising:
accepting an operation input of the user to search for desired object contents information;
displaying information on a monitor;
registering, in the overall operation history database, all of contents information of the contents having been subjected to an operation from among a plurality of operations and operation information including an operation time, the registering including separating the composite operation information into the operation information and the contents information, relating the separated operation information and the separated contents information to each other, and registering the contents information and the operation information in a per-contents operation history database based on the relating of the separated operation information and the separated contents information;
matching by a processor, when the operation input is accepted, historical records of composite operation information having been accepted during a certain period of time against the historical records of the composite operation information registered in the overall operation history database;
extracting, as the object contents information, at least one item of contents information having a high certainty based on a matching result by referring to a certainty determination parameter related to the user;
generating display information of the extracted object contents information;
displaying the generated display information on the monitor;
accepting the operation input from the user;
holding the object contents information;
comparing the composite operation information included in the operation input, which has been accepted after displaying the generated display information, with the held object contents information;
generating effective contents information from a comparison result;

accepting the effective contents information and the composite operation information related to the effective contents information;
extracting effective operation information from the accepted effective contents information and the accepted composite operation information;
updating the certainty determination parameter based on the extracted effective operation information;
accepting the contents information obtained with the registering;
determining, based on a predetermined object contents determination criterion, whether the accepted contents information is the object contents information; and
informing, in the relating, the contents information obtained with the registering and a flag indicating whether or not the accepted contents information is the object contents information,
wherein the relating includes registering the contents information, the operation information, and the flag in the per-contents operation history database based on the related contents information.

18. An object contents search support apparatus supporting a user to search for desired object contents information, the object contents search support apparatus comprising:
an operating part accepting an operation input from the user;
an information collecting part collecting, in accordance with the operation input from the operating part, composite operation information including all of contents information of the contents having been subjected to an operation from among a plurality of operations and operation information including an operation time;
an overall operation history database in which the composite operation information collected by the information collecting part is registered, the registering including separating the composite operation information into the operation information and the contents information, relating the separated operation information and the separated contents information to each other, and registering the contents information and the operation information in a per-contents operation history database based on the relating of the separated operation information and the separated contents information;
a processor matching, when the operation input is accepted, historical records of the composite operation information having been accepted during a certain period of time against the historical records of the composite operation information registered in the overall operation history database, and extracting, as the object contents information, at least one item of contents information having a high certainty based on a matching result by referring to a certainty determination parameter related to the user;
a display part generating display information of the object contents information extracted by the processor, and displaying the generated display information;
a feedback part accepting the operation input from the user, holding the object contents information, comparing the composite operation information included in the operation input, which has been accepted after displaying the generated display information, with the held object contents information, and generating effective contents information from a comparison result; and
a verifying part accepting the effective contents information and the composite operation information related to the effective contents information from the feedback part, extracting effective operation information from the accepted effective contents information and the accepted composite operation information, and updating the certainty determination parameter based on the extracted effective operation information, wherein
the contents information obtained with the registering is accepted,
it is determined, based on a predetermined object contents determination criterion, whether the accepted contents information is the object contents information,
the relating includes informing the contents information obtained with the registering and a flag indicating whether or not the accepted contents information is the object contents information, and
the relating includes registering the contents information, the operation information, and the flag in the per-contents operation history database based on the related contents information.

* * * * *